(12) United States Patent
Orsino et al.

(10) Patent No.: US 12,369,213 B2
(45) Date of Patent: Jul. 22, 2025

(54) SIDELINK TRANSMISSION CONTINUITY

(71) Applicant: Telefonaktiebolaget LM Ericsson (publ), Stockholm (SE)

(72) Inventors: Antonino Orsino, Kirkkonummi (FI); Mohammed Yazid Lyazidi, Hässelby (SE); Congchi Zhang, Shanghai (CN); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 383 days.

(21) Appl. No.: 17/635,035

(22) PCT Filed: Aug. 13, 2020

(86) PCT No.: PCT/EP2020/072803
§ 371 (c)(1),
(2) Date: Feb. 14, 2022

(87) PCT Pub. No.: WO2021/028551
PCT Pub. Date: Feb. 18, 2021

(65) Prior Publication Data
US 2022/0287126 A1 Sep. 8, 2022

(30) Foreign Application Priority Data
Aug. 14, 2019 (WO) ............... PCT/CN2019/100621

(51) Int. Cl.
*H04W 76/16* (2018.01)
*H04W 76/20* (2018.01)
*H04W 92/18* (2009.01)

(52) U.S. Cl.
CPC ........... *H04W 76/16* (2018.02); *H04W 76/20* (2018.02); *H04W 92/18* (2013.01)

(58) Field of Classification Search
CPC ..... H04W 76/16; H04W 76/20; H04W 92/18; H04W 4/40; H04W 92/20; H04W 76/14; H04W 76/15; H04W 76/27
See application file for complete search history.

(56) References Cited

U.S. PATENT DOCUMENTS

2017/0332419 A1 11/2017 Kim et al.
2018/0176834 A1 6/2018 Wei et al.
(Continued)

FOREIGN PATENT DOCUMENTS

EP 3416436 A1 12/2018
WO 2015116865 A1 8/2015
(Continued)

OTHER PUBLICATIONS

OPPO, "R1-1900293: Discussion on dual-connectivity in NR-V2X," 3GPP TSG-RAN WG1 AG Meeting #1901, Jan. 12-25, 2019, Taipei, Taiwan, 4 pages.
(Continued)

*Primary Examiner* — Dady Chery
(74) *Attorney, Agent, or Firm* — Withrow & Terranova, PLLC

(57) ABSTRACT

Systems and methods are disclosed herein for exchanging Sidelink (SL) User Equipment (UE) context and configurations between a Master Node (MN) and a Secondary node (SN), e.g., in normal Multi-Radio Dual Connectivity (MR-DC) operations. In some embodiments, the SL UE context and configuration are exchanged between the MN and the SN via inter-node Radio Resource Control (RRC) messages. In this way, the two network nodes (the MN and the SN) are aware of the SL transmission going on under their coverage and can take the necessary actions to guarantee a stable and reliable SL connectivity.

16 Claims, 22 Drawing Sheets

(56) References Cited

U.S. PATENT DOCUMENTS

| | | | |
|---|---|---|---|
| 2018/0368191 A1* | 12/2018 | Vutukuri | H04W 76/15 |
| 2019/0223231 A1 | 7/2019 | Muraoka et al. | |
| 2020/0045674 A1 | 2/2020 | Tseng et al. | |
| 2020/0053592 A1 | 2/2020 | Turtinen et al. | |
| 2020/0163005 A1 | 5/2020 | Rao et al. | |
| 2020/0267790 A1 | 8/2020 | Kim et al. | |
| 2022/0217575 A1 | 7/2022 | Wang et al. | |

FOREIGN PATENT DOCUMENTS

| | | | |
|---|---|---|---|
| WO | 2018231748 A1 | 12/2018 | |
| WO | 2019061180 A1 | 4/2019 | |
| WO | 2021028549 A1 | 2/2021 | |

OTHER PUBLICATIONS

OPPO, "R2-1905580: Discussion on network involvement in unicast link establishment," 3GPP TSG-RAN WG2 Meeting #106, May 13-17, 2019, Reno, Nevada, 7 pages.

Notice of Reasons for Rejection for Japanese Patent Application No. 2022-508846, mailed Apr. 4, 2023, 9 pages.

Author Unknown, "Technical Specification Group Services and System Aspects; Study on enhancement of 3GPP Support for 5G V2X Services (Release 16)," Technical Report 22.886, Version 16.2.0, Dec. 2018, 3GPP Organizational Partners, 76 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.6.0, Jun. 2019, 3GPP Organizational Partners, 956 pages.

Author Unknown, "Technical Specification Group Radio Access Network; Evolved Universal Terrestrial Radio Access (E-UTRA) and NR; Multi-connectivity; Stage 2 (Release 15)," Technical Specification 37.340, Version 15.6.0, Jun. 2019, 3GPP Organizational Partners, 69 pages.

Author Unknown, "Technical Specification Group Radio Access Network; NR; NR and NG-RAN Overall Description; Stage 2 (Release 15)," Technical Specification 38.300, Version 15.6.0, Jun. 2019, 3GPP Organizational Partners, 99 pages.

Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 517 pages.

Ericsson, "R2-1907365: Discussions on NR V2X in MR-DC scenarios," 3GPP TSG-RAN WG2 #106, May 13-17, 2019, Reno, Nevada, 4 pages.

Ericsson, "R3-190822: Resource coordination for cross-RAT V2X sidelink communication," 3GPP TSG-RAN3 Meeting #103, Feb. 25-Mar. 1, 2019, Athens, Greece, 3 pages.

LG Electronics Inc., "R3-190554: Considerations on the issues for MR-DC based NR V2X," 3GPP TSG-RAN WG3 Meeting #103, Feb. 25-Mar. 1, 2019, Athens, Greece, 2 pages.

Samsung, "R2-1904807: Cross-RAT resource allocation/configuration in MR-DC," 3GPP TSG-RAN WG2 Meeting #105bis, Apr. 8-12, 2019, Xi'an, China, 3 pages.

International Search Report and Written Opinion for International Patent Application No. PCT/EP2020/072803, mailed Oct. 12, 2020, 16 pages.

Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 529 pages.

LG Electronics, "RP-190983: 5G V2X with NR sidelink," 3GPP TSG RAN meeting #84, Jun. 3-6, 2019, Newport Beach, California, 38 pages.

International Search Report and Written Opinion for International Patent Application No. PCT/EP2020/072801, mailed Nov. 10, 2020, 12 pages.

Invitation to Indicate the Basis for Amendments for European Patent Application No. 20754133.5, mailed May 11, 2023, 3 pages.

Notice of Reasons for Refusal for Japanese Patent Application No. 2022-508846, mailed Oct. 10, 2023, 6 pages.

Decision to Grant for Japanese Patent Application No. 2022-508846, mailed Jan. 23, 2024, 5 pages.

Examination Report for European Patent Application No. 20757302.3, mailed Jun. 9, 2023, 6 pages.

Result of Consultation for European Patent Application No. 20754133.5, mailed Jul. 3, 2024, 4 pages.

Non-Final Office Action for U.S. Appl. No. 17/634,275, mailed Jun. 12, 2024, 26 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Technical Specification 36.300, Version 14.1.0, Dec. 2016, 3GPP Organizational Partners, 317 pages.

Final Office Action for U.S. Appl. No. 17/634,275, mailed Oct. 15, 2024, 30 pages.

* cited by examiner

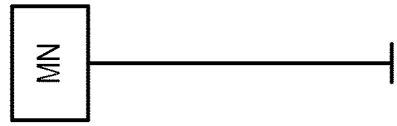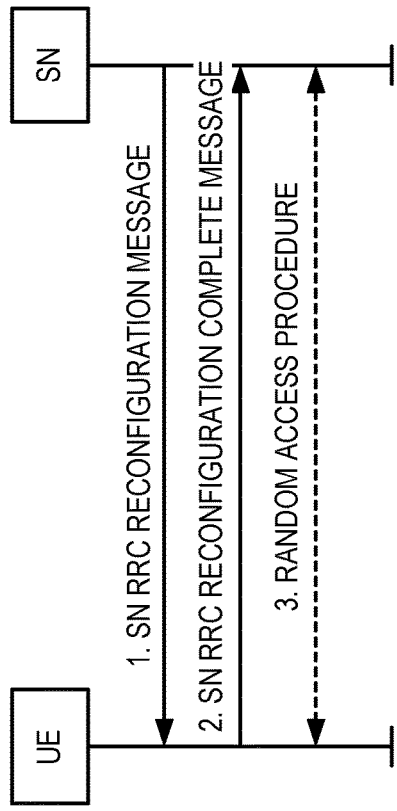
FIG. 8
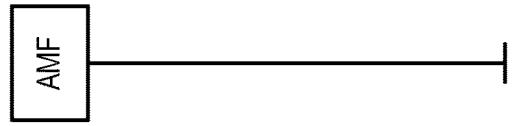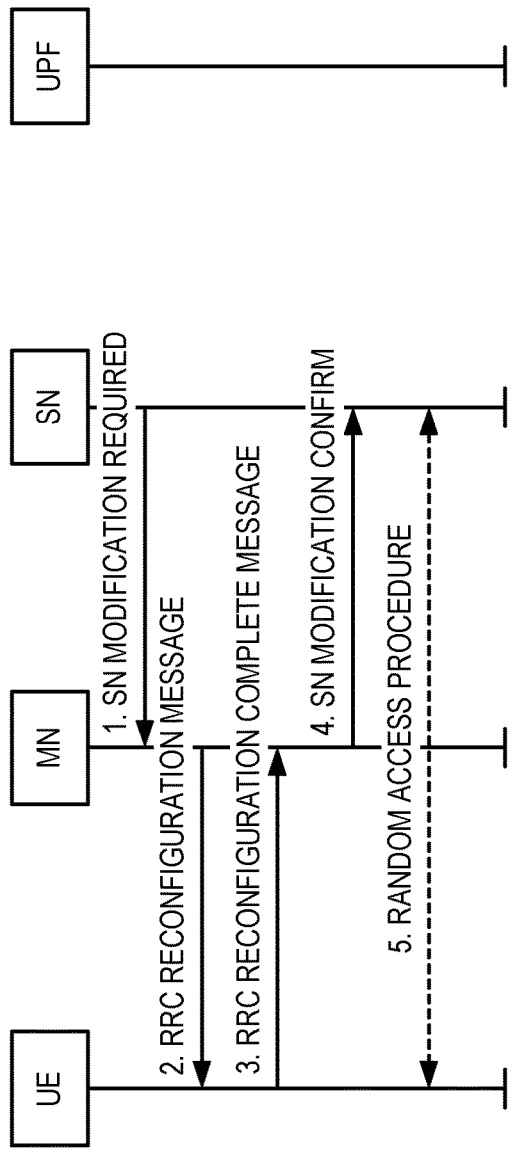
FIG. 9

SIDELINK TRANSMISSION CONTINUITY

This application is a 35 U.S.C. § 371 national phase filing of International Application No. PCT/EP2020/072803, filed Aug. 13, 2020, which claims the benefit of International Application No. PCT/CN2019/100621, filed Aug. 14, 2019, the disclosures of which are incorporated herein by reference in their entireties.

TECHNICAL FIELD

The present disclosure relates to sidelink communication in a cellular communications system.

BACKGROUND

In Third Generation Partnership Project (3GPP), the Dual Connectivity (DC) solution has been specified, both for Long Term Evolution (LTE) and between LTE and Fifth Generation (5G) New Radio (NR). In DC, two nodes are involved, a Master Node (MN, or Master enhanced or evolved Node B (eNB) (MeNB)) and a Secondary Node (SN, or Secondary eNB (SeNB)). Multi-Connectivity (MC) is the case when there are more than two nodes involved. Also, it has been proposed in 3GPP that DC is used in the Ultra Reliable Low Latency Communications (URLLC) cases to enhance the robustness and to avoid connection interruptions.

There are different ways to deploy a 5G NR network with or without interworking with LTE (also referred to as Evolved Universal Terrestrial Radio Access (E-UTRA)) and Evolved Packet Core (EPC), as illustrated in FIG. 1. In principle, NR and LTE can be deployed without any interworking, denoted by NR Stand-Alone (SA) operation. That is, the NR base station (gNB) in NR can be connected to the 5G Core Network (CN) (5GCN) and the eNB in LTE can be connected to the EPC with no interconnection between the two (as illustrated by Option 1 and Option 2 in FIG. 1). On the other hand, the first supported version of NR is the so-called E-UTRA NR DC (EN-DC), illustrated by Option 3 in FIG. 1. In such a deployment, DC between NR and LTE is applied with LTE as the MN and NR as the SN. The Radio Access Network (RAN) node (gNB) supporting NR may not have a Control Plane (CP) connection to the CN (EPC), but instead may rely on the LTE as MN (MeNB). This is also called "Non-standalone NR." In this case, the functionality of an NR cell is limited and would be used for connected mode User Equipments (UEs) as a booster and/or diversity leg, but an RRC_IDLE UE cannot camp on these NR cells.

With introduction of 5GCN, other options may be also valid. As mentioned above, Option 2 supports SA NR deployment where the gNB is connected to the 5GCN. Similarly, LTE can also be connected to the 5GCN using Option 5 (also known as enhanced LTE (eLTE), E-UTRA/5GCN, or LTE/5GCN, and the node can be referred to as a Next Generation eNB (NG-eNB)). In these cases, both NR and LTE are seen as part of the Next Generation RAN (NG-RAN) (and both the NG-eNB and the gNB can be referred to as NG-RAN nodes). It is worth noting that Option 4 and Option 7 of FIG. 1 are other variants of DC between LTE and NR which will be standardized as part of NG-RAN connected to the 5GCN, denoted by Multi-Radio DC (MR-DC). Thus, under the MR-DC umbrella are the following:

EN-DC (Option 3): LTE is the MN and NR is the SN (EPC CN employed),

NR E-UTRA DC (NE-DC) (Option 4): NR is the MN and LTE is the SN (5GCN employed), NG-RAN E-UTRA NR DC (NGEN-DC) (Option 7): LTE is the MN and NR is the SN (5GCN employed), and NR DC (variant of Option 2): DC where both the MN and SN are NR (5GCN employed).

As migration for these options may differ for different operators, it is possible to have deployments with multiple options in parallel in the same network. For example, there could be an eNB supporting Options 3, 5, and 7 of FIG. 1 in the same network as an NR base station supporting Options 2 and 4 of FIG. 1. In combination with DC solutions between LTE and NR, it is also possible to support Carrier Aggregation (CA) in each cell group (i.e., Master Cell Group (MCG) and Secondary Cell Group (SCG)) and DC between nodes on the same Radio Access Technology (RAT) (e.g., NR-NR DC). For the LTE cells, a consequence of these different deployments is the coexistence of LTE cells associated to eNBs connected to EPC, 5GCN, or both EPC/5GCN.

As noted earlier, DC is standardized for both LTE and EN-DC. LTE DC and EN-DC are designed differently when it comes to which nodes control what. Basically, there are two options: centralized solutions (such as LTE DC) and decentralized solutions (such as EN-DC).

FIG. 2 illustrates a schematic CP architecture for DC in LTE DC and EN-DC. The main difference here is that in EN-DC, the SN has a separate Radio Resource Control (RRC) entity (NR RRC). This means that the SN can also control the UE, sometimes without the knowledge of the MN, but often with the need to coordinate with the MN. In LTE DC, the RRC decisions are always coming from the MN (i.e., MN to UE). However, the SN still decides the configuration of the SN since it is only the SN itself that has knowledge of the resources, capabilities, etc. of the SN.

For EN-DC, the major changes compared to LTE DC are as follows:
the introduction of split bearer from the SN (known as SCG split bearer),
the introduction of split bearer for RRC, and
the introduction of a direct RRC from the SN (also referred to as SCG Signaling Radio Bearer (SRB)).

FIGS. 3 and 4 show the User Plane (UP) and CP architectures for EN-DC. In particular, FIG. 3 illustrates network side protocol termination options for MCG, SCG, and split bearers in MR-DC with EPC (EN-DC). FIG. 4 illustrates a network architecture for CP in EN-DC.

The SN is sometimes referred to as a Secondary gNB (SgNB) (where gNB is an NR base station), and the MN as MeNB in case the LTE is the MN and NR is the SN. In the other case where NR is the MN and LTE is the SN, the corresponding terms are SeNB and Master gNB (MgNB), respectively.

Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for the uplink, the network configures the UE to use the MCG, SCG, or both legs. The terms "leg," "path," and "RLC bearer" are used interchangeably throughout this document.

Inter-node RRC messages are RRC messages that are sent either across the X2-, Xn-, or the NG-interface, either to or from the gNB (i.e., a single 'logical channel' is used for all RRC messages transferred across network nodes). The information could originate from or be destined for another RAT.

In this regard, Table 1 below includes excerpts from 3GPP Technical Specification (TS) 38.331 V15.6.0.

TABLE 1

CG-Config
This message is used to transfer the SCG radio configuration as generated by the SgNB or SeNB.
Direction: Secondary gNB or eNB to master gNB or eNB.

CG-Config message

```
-- ASN1START
-- TAG-CG-CONFIG-START
CG-Config ::=                    SEQUENCE {
   criticalExtensions                     CHOICE {
      c1                                     CHOICE{
         cg-Config                   CG-Config-IEs,
         spare3 NULL, spare2 NULL, spare1 NULL
      },
      criticalExtensionsFuture           SEQUENCE { }
   }
}
CG-Config-IEs ::=       SEQUENCE {
   scg-CellGroupConfig              OCTET STRING (CONTAINING RRCReconfiguration)    OPTIONAL,
   scg-RB-Config                    OCTET STRING (CONTAINING RadioBearerConfig)    OPTIONAL,
   configRestrictModReq             ConfigRestrictModReqSCG                          OPTIONAL,
   drx-InfoSCG                      DRX-Info                                         OPTIONAL,
   candidateServingFreqListNR       OCTET STRING (CONTAINING MeasResultList2NR)     OPTIONAL,
   measConfigSN                     MeasConfigSN                                     OPTIONAL
   selectedBandCombination           BandCombinationInfoSN                            OPTIONAL,
   fr-InfoListSCG                   FR-InfoList                                      OPTIONAL,
   candidateCellInfoListSN          CandidateServing FreqListNR                      OPTIONAL,
   nonCriticalExtension             CG-Config-v1540-IEs                              OPTIONAL,
}
CG-Config-v1540-IEs ::=     SEQUENCE {
   pSCellFrequency                  ARFCN-ValueNR,                                   OPTIONAL,
   reportCGI-RequestNR              SEQUENCE {
      requestedCellInfo                SEQUENCE {
         ssbFrequency                     ARFCN-ValueNR
         cellForWhich ToReportCGI         PhysCellId
      }                                                                OPTIONAL
   }                                                                   OPTIONAL,
   ph-InfoSCG                       PH-TypeListSCG                                   OPTIONAL,
   nonCriticalExtension             CG-Config-v1560-IEs                              OPTIONAL
}
CG-Config-v1560-IEs ::=     SEQUENCE {
   pSCellFrequencyEUTRA             ARFCN-ValueEUTRA,                                OPTIONAL
   scg-CellGroupConfigEUTRA         OCTET STRING                                     OPTIONAL,
   candidateCellInfoListSN-EUTRA    OCTET STRING                                     OPTIONAL,
   candidateServingFreqListEUTRA        CandidateServing FreqListEUTRA               OPTIONAL
   needForGaps                      ENUMERATED {true}                                OPTIONAL,
   drx-ConfigSCG                    DRX-Config                                       OPTIONAL,
   reportCGI-RequestEUTRA           SEQUENCE {
      requestedCellInfoEUTRA           SEQUENCE {
         eutraFrequency                   ARFCN-ValueEUTRA
         cellForWhich ToReportCGI-EUTRA    EUTRA-PhysCellId
      }                                                                OPTIONAL
   }                                                                   OPTIONAL,
   nonCriticalExtension             SEQUENCE { }                                     OPTIONAL
}
PH-TypeListSCG ::=               SEQUENCE (SIZE (1..maxNrofServingCells)) OF PH-InfoSCG
PH-InfoSCG ::=                   SEQUENCE {
   servCellIndex                    ServCellIndex,
   ph-Uplink                        PH-UplinkCarrierSCG,
   ph-SupplementaryUplink           PH-UplinkCarrierSCG                              OPTIONAL,
   ...
}
PH-UplinkCarrierSCG ::=     SEQUENCE{
   ph-Type1or3                 ENUMERATED {type1, type3},
   ...
}
MeasConfigSN ::= SEQUENCE {
   measured FrequenciesSN           SEQUENCE (SIZE (1..maxMeasFreqsSN)) OF NR-FreqInfo OPTIONAL,
   ...
}
NR-FreqInfo ::= SEQUENCE {
   measuredFrequency                ARFCN-ValueNR                                    OPTIONAL,
   ...
}
Config RestrictModReqSCG ::=     SEQUENCE {
   requestedBC-MRDC                 BandCombinationInfoSN                            OPTIONAL,
   requestedP-MaxFR1                P-Max                                            OPTIONAL,
```

TABLE 1-continued

```
...,
    [[
    requestedPDCCH-BlindDetectionSCG   INTEGER (1..15)                              OPTIONAL,
    requestedP-MaxEUTRA         P-Max                                               OPTIONAL
    ]]
}
BandCombinationIndex ::= INTEGER (1..maxBandComb)
BandCombinationInfoSN ::=   SEQUENCE {
    bandCombination Index           BandCombinationIndex,
    requested FeatureSets           FeatureSetEntryIndex
}
FR-InfoList ::= SEQUENCE (SIZE (1..maxNrofServingCells-1)) OF FR-Info
FR-Info ::= SEQUENCE {
    servCellIndex           ServCellIndex,
    fr-Type                 ENUMERATED {fr1, fr2}
}
CandidateServingFreqListEUTRA ::= SEQUENCE (SIZE (1.. maxFreqIDC-MRDC)) OF ARFCN-ValueEUTRA
CandidateServingFreqListNR ::= SEQUENCE (SIZE (1.. maxFreqIDC-MRDC)) OF ARFCN-ValueNR
-- TAG-CG-CONFIG-STOP
-- ASN1STOP
```

CG-Config field descriptions candidateCellInfoListSN
Contains information regarding cells that the source secondary node suggests the target secondary gNB to consider configuring.
candidateCellInfoListSN-EUTRA
Includes the MeasResultList3EUTRA as specified in TS 36.331 [10]. Contains information regarding cells that the source secondary node suggests the target secondary eNB to consider configuring. This field is only used in NE-DC.
candidateServingFreqListNR, candidateServingFreqListEUTRA
Indicates frequencies of candidate serving cells for In-Device Co-existence Indication (see TS 36.331 [10]).
configRestrictModReq
Used by SN to request changes to SCG configuration restrictions previously set by MN to ensure UE capabilities are respected. E.g. can be used to request configuring an NR band combination whose use MN has previously forbidden.
drx-ConfigSCG
This field contains the complete DRX configuration of the SCG. This field is only used in NR-DC.
drx-InfoSCG
This field contains the DRX long and short cycle configuration of the SCG. This field is used in (NG)EN-DC and NE-DC.
fr-InfoListSCG
Contains information of FR information of serving cells that include PScell and Scells configured in SCG.
measuredFrequenciesSN
Used by SN to indicate a list of frequencies measured by the UE.
needForGaps
In NE-DC, indicates wheter the SN requests gNB to configure measurements gaps.
ph-InfoSCG
Power headroom information in SCG that is needed in the reception of PHR MAC CE of MCG
ph-SupplementaryUplink
Power headroom information for supplementary uplink. In the case of (NG)EN-DC and NR-DC, this field is only present when two UL carriers are configued for a serving cell and one UL carrier reports type1 PH while the other reports type 3 PH.
ph-Type1or3
Type of power headroom for a certain serving cell in SCG (PSCell and activated SCells). Value type1 refers to type 1 power headroom, value type3 refers to type 3 power headroom. (See TS 38.321 [3]).
ph-Uplink
Power headroom information for uplink.
pSCellFrequency, pSCellFrequencyEUTRA
Indicates the frequency of PSCell in NR (i.e., pSCellFrequency) or E-UTRA (i.e., pSCellFrequencyEUTRA). In this version of the specification, pSCellFrequency is not used in NE-DC whereas pSCellFrequencyEUTRA is only used in NE-DC.
reportCGI-RequestNR, reportCGI-RequestEUTRA
Used by SN to indicate to MN about configuring reportCGI procedure. The request may optionally contain information about the cell for which SN intends to configure reportCGI procedure. In this version of the specification, the reportCGI-RequestNR is used in (NG)EN-DC and NR-DC whereas reportCGI-RequestEUTRA is used only for NE-DC.
requestedPDCCH-BlindDetectionSCG
Requested value of the reference number of cells for PDCCH blind detection allowed to be configured for the SCG.
requestedP-MaxEUTRA
Requested valumue for the maximu power for the serving cells the UE can use in E-UTRA SCG. This field is only used in NE-DC.
requestedP-MaxFR1
Requested value for the maximum power for the serving cells on frequency range 1 (FR1) in this secondary cell group (see TS 38.104 [12]) the UE can use in NR SCG.
requestedBC-MRDC
Used to request configuring an NR band combination and corresponding feature sets which are forbidden to use by MN.
scg-CellGroupConfig
Contains the RRCReconfiguration message:
to be sent to the UE, used upon SCG establishment or modification, as generated (entirely) by the (target) SgNB. In this case, the SN sets the RRCReconfiguration message in accordance with section 6 e.g. regarding the "Need" or "Cond" statements.
or
including the current SCG configuration of the UE, when provided in response to a query from MN, or in SN triggered SN change to enable delta signaling by the target SN. In this case, the SN sets the RRCReconfiguration message in accordance with section 11.2.3.
The field is absent if neither SCG (re)configuration nor SCG configuration query nor SN triggered SN change is performed, e.g. at inter-node capability/configuration coordination which does not result in SCG (re)configuration towards the UE. This field is not applicable in NE-DC.

TABLE 1-continued scg-CellGroupConfigEUTRA
Includes the E-UTRA RRCConnectionReconfiguration message as specified in TS 36.331 [10]. In this version of the specification, the E-UTRA RRC message can only include the field scg-Configuration. Used to (re-)configure the SCG configuration upon SCG establishment or modification, as generated (entirely) by the (target) SeNB. This field is absent when master gNB uses full configuration option. This field is only used in NE-DC.
scg-RB-Config
Contains the IE RadioBearerConfig.
to be sent to the UE, used to (re-)configure the SCG RB configuration upon SCG establishment or modification, as generated (entirely) by the (target) SgNB or SeNB. In this case, the SN sets the RadioBearerConfig in accordance with section 6, e.g. regarding the "Need" or "Cond" statements.
or
including the current SCG RB configuration of the UE, when provided in response to a query from MN or in SN triggered SN change to enable delta signaling by the target SN. In this case, the SN sets the RRCReconfiguration message in accordance with section 11.2.3.
The field is absent if neither SCG (re)configuration nor SCG configuration query nor SN triggered SN change is performed, e.g. at inter-node capability/configuration coordination which does not result in SCG RB (re)configuration.
selectedBandCombination
Indicates the band combination selected by SN for (NG)EN-DC, NE-DC, and NR-DC.

BandCombinationInfoSN field descriptions bandCombinationIndex
The position of a band combination in the supportedBandCombinationList
requestedFeatureSets
The position in the FeatureSetCombination which identifies one FeatureSetUplink Downlink for each band entry in the associated band combination
- CG-ConfigInfo
This message is used by master eNB or gNB to request the SgNB or SeNB to perform certain actions e.g. to establish, modify or release an SCG. The message may include additional information e.g. to assist the SgNB or SeNB to set the SCG configuration. It can also be used by a CU to request a DU to perform certain actions, e.g. to establish, modify or release an MCG or SCG.
Direction: Master eNB or gNB to secondary gNB or eNB, alternatively CU to DU.

CG-ConfigInfo message

```
-- ASN1START
-- TAG-CG-CONFIGINFO-START
CG-ConfigInfo ::=              SEQUENCE {
   criticalExtensions                  CHOICE {
      c1                               CHOICE{
         cg-ConfigInfo                       CG-ConfigInfo-IEs,
         spare3 NULL, spare2 NULL, spare1 NULL
      },
      criticalExtensionsFuture         SEQUENCE { }
   }
}
CG-ConfigInfo-IEs ::=     SEQUENCE {
   ue-CapabilityInfo           OCTET STRING (CONTAINING UE-CapabilityRAT-ContainerList)   OPTIONAL, -- Cond SN-AddMod
   candidateCellInfoListSN              MeasResultList2NR                                 OPTIONAL,
   candidateCellInfoListMN              OCTET STRING (CONTAINING MeasResultList2NR)       OPTIONAL,
   measResultCellListSFTD-NR            MeasResultCellListSFTD-NR                         OPTIONAL,
   scgFailureInfo              SEQUENCE {
      failure Type                     ENUMERATED { t310-Expiry, randomAccessProblem,
                                          rlc-MaxNumRetx, synchReconfigFailure-SCG,
                                          scg-reconfigFailure,
                                          srb3-IntegrityFailure},
      measResultSCG                    OCTET STRING (CONTAINING MeasResultSCG-Failure)
   }                                                                                     OPTIONAL,
   configRestrictInfo          ConfigRestrictInfoSCG                                     OPTIONAL,
   drx-InfoMCG                 DRX-Info                                                  OPTIONAL,
   measConfigMN                MeasConfigMN                                              OPTIONAL,
   sourceConfigSCG             OCTET STRING (CONTAINING RRCReconfiguration)              OPTIONAL,
   scg-RB-Config               OCTET STRING (CONTAINING RadioBearerConfig)               OPTIONAL,
   mcg-RB-Config               OCTET STRING (CONTAINING RadioBearerConfig)               OPTIONAL,
   mrdc-AssistanceInfo         MRDC-AssistanceInfo                                       OPTIONAL,
   nonCriticalExtension        CG-ConfigInfo-v1540-IEs                                   OPTIONAL
}
CG-ConfigInfo-v1540-IEs ::=   SEQUENCE {
   candidateCellInfoListMN-EUTRA        OCTET STRING                                     OPTIONAL,
   candidateCellInfoListSN-EUTRA        OCTET STRING                                     OPTIONAL,
   sourceConfigSCG-EUTRA                OCTET STRING                                     OPTIONAL,
   scgFailureInfoEUTRA         SEQUENCE {
      failure TypeEUTRA                ENUMERATED { t313-Expiry, randomAccessProblem,
                                          rlc-MaxNumRetx, scg-ChangeFailure},
      measResultSCG-EUTRA              OCTET STRING
   }                                                                                     OPTIONAL,
   drx-ConfigMCG               DRX-Config                                                OPTIONAL,
   measResultReportCGI-EUTRA   SEQUENCE {
      eutraFrequency                   ARFCN-ValueEUTRA,
      cellForWhichToReportCGI-EUTRA    EUTRA-PhysCellId,
      cgi-InfoEUTRA                    CGI-InfoEUTRA
   }                                                                                     OPTIONAL,
```

TABLE 1-continued

```
    measResultCellListSFTD-EUTRA           MeasResultCellListSFTD-EUTRA        OPTIONAL,
    fr-InfoListMCG                         FR-InfoList                         OPTIONAL,
    nonCriticalExtension                   SEQUENCE { }                        OPTIONAL
}
ConfigRestrictInfoSCG ::=      SEQUENCE {
    allowedBC-ListMRDC                     BandCombinationInfoList             OPTIONAL,
    powerCoordination-FR1                  SEQUENCE {
      p-maxNR-FR1                            P-Max                             OPTIONAL,
      p-maxEUTRA                             P-Max                             OPTIONAL,
      p-maxUE-FR1                            P-Max                             OPTIONAL
    }                                                                          OPTIONAL,
    servCellIndexRangeSCG                  SEQUENCE {
      lowBound                               ServCellIndex,
      upBound                                ServCellIndex
    }                                                                          OPTIONAL, -- Cond SN-AddMod
    maxMeasFreqsSCG                        INTEGER(1..maxMeasFreqsMN)          OPTIONAL,
-- TBD Late Drop: If maxMeasIdentitiesSCG is used needs to be decided after RAN4 replies to the LS on measurement
requirements for MR-DC.
    maxMeasIdentitiesSCG-NR                INTEGER(1..maxMeasIdentitiesMN)     OPTIONAL,
    ...,
                                                                               OPTIONAL,
    [[
    maxNumberROHC-ContextSessionsSN  INTEGER(0.. 16384)                        OPTIONAL,
    pdcch-BlindDetectionSCG                INTEGER (1..15)
    selectedBandEntriesMN                  SEQUENCE (SIZE (1..maxSimultaneousBands)) OF BandEntryIndex  OPTIONAL
    ]]
}
BandEntryIndex ::=                 INTEGER (0.. maxNrofServingCells)
PH-TypeListMCG ::=
PH-InfoMCG ::=                     SEQUENCE (SIZE (1..maxNrofServingCells)) OF PH-InfoMCG
    servCellIndex                        ServCellIndex,
    ph-Uplink                            PH-UplinkCarrierMCG,
    ph-SupplementaryUplink                 PH-UplinkCarrierMCG                 OPTIONAL,
    ...
}
PH-UplinkCarrierMCG ::=            SEQUENCE{
    ph-Type1or3                          ENUMERATED {type1, type3},
    ...
}
BandCombinationInfoList ::=        SEQUENCE (SIZE (1..maxBandComb)) OF BandCombinationInfo
BandCombinationInfo ::=            SEQUENCE {
    bandCombinationIndex                 BandCombinationIndex,
    allowedFeatureSetsList               SEQUENCE (SIZE (1..maxFeatureSetsPerBand)) OF FeatureSetEntryIndex
}
FeatureSetEntryIndex ::=           INTEGER (1.. maxFeatureSetsPerBand)
DRX-Info ::=                       SEQUENCE {
    drx-LongCycleStartOffset             CHOICE {
      ms10                                 INTEGER(0..9),
      ms20                                 INTEGER(0..19),
      ms32                                 INTEGER(0..31),
      ms40                                 INTEGER(0..39),
      ms60                                 INTEGER(0..59),
      ms64                                 INTEGER(0..63),
      ms70                                 INTEGER(0..69),
      ms80                                 INTEGER(0..79),
      ms128                                INTEGER(0..127),
      ms160                                INTEGER(0..159),
      ms256                                INTEGER(0..255),
      ms320                                INTEGER(0..319),
      ms512                                INTEGER(0..511),
      ms640                                INTEGER(0..639),
      ms1024                               INTEGER(0..1023),
      ms1280                               INTEGER(0..1279),
      ms2048                               INTEGER(0..2047),
      ms2560                               INTEGER(0..2559),
      ms5120                               INTEGER(0..5119),
      ms10240                              INTEGER(0..10239)
    },
    shortDRX                             SEQUENCE {
      drx-ShortCycle                       ENUMERATED {
                                             ms2, ms3, ms4, ms5, ms6, ms7, ms8, ms10, ms14, ms16, ms20, ms30, ms32,
                                             ms35, ms40, ms64, ms80, ms128, ms160, ms256, ms320, ms512, ms640, spare9,
                                             spare8, spare7, spare6, spare5, spare4, spare3, spare2, spare1 },
      drx-ShortCycleTimer                  INTEGER (1..16)
    }                                                                          OPTIONAL
}
MeasConfigMN ::= SEQUENCE {
    measuredFrequenciesMN                SEQUENCE (SIZE (1..maxMeasFreqsMN)) OF NR-FreqInfo   OPTIONAL,
    measGapConfig                        SetupRelease { GapConfig }           OPTIONAL,
    gapPurpose                           ENUMERATED {perUE, perFR1}            OPTIONAL,
    ...,
```

TABLE 1-continued

```
    [[
    measGapConfigFR2                    SetupRelease { GapConfig }              OPTIONAL
    ]]
}
MRDC-AssistanceInfo ::= SEQUENCE {
    affectedCarrierFreqCombInfoListMRD    SEQUENCE (SIZE (1..maxNrofCombIDC)) OF AffectedCarrierFreqCombInfoMRDC,
    ...
}
AffectedCarrierFreqCombInfoMRDC ::= SEQUENCE {
    victimSystemType              VictimSystemType,
    interferenceDirectionMRDC     ENUMERATED {eutra-nr, nr, other, utra-nr-other, nr-other, spare3, spare2, spare1},
    affectedCarrierFreqCombMRDC       SEQUENCE {
        affectedCarrierFreqCombEUTRA        AffectedCarrierFreqCombEUTRA              OPTIONAL,
        affectedCarrierFreqCombNR           Affected CarrierFreqCombNR
    } OPTIONAL
}
VictimSystemType ::= SEQUENCE {
    gps         ENUMERATED {true}     OPTIONAL,
    glonass     ENUMERATED {true}     OPTIONAL,
    bds         ENUMERATED {true}     OPTIONAL,
    galileo     ENUMERATED {true}     OPTIONAL,
    wlan        ENUMERATED {true}     OPTIONAL,
    bluetooth   ENUMERATED {true}     OPTIONAL
}
AffectedCarrierFreqCombEUTRA ::= SEQUENCE (SIZE (1..maxNrofServingCellsEUTRA)) OF ARFCN-ValueEUTRA
AffectedCarrierFreqCombNR ::= SEQUENCE (SIZE (1..maxNrofServingCells)) OF ARFCN-ValueNR
-- TAG-CG-CONFIGINFO-STOP
-- ASN1STOP
```

CG-ConfigInfo field descriptions allowedBC-ListMRDC
A list of indices referring to band combinations in MR-DC capabilities from which SN is allowed to select the SCG band combination. Each entry refers to a band combination numbered according to supportedBandCombinationList in the UE-MRDC-Capability (in case of (NG)EN-DC or NE-DC) or UE-NR-Capability (in case of NR-DC) and the Feature Sets allowed for each band entry. All MR-DC band combinations indicated by this field comprise the MCG band combination, which is a superset of the MCG band(s) selected by MN.

candidateCellInfoListMN, candidateCellInfoListSN
Contains information regarding cells that the master node or the source node suggests the target gNB to consider configuring.
For (NG)EN-DC, including CSI-RS measurement results in candidateCellInfoListMN is not supported in this version of the specification.
For NR-DC, including SSB and/or CSI-RS measurement results in candidateCellInfoListMN is supported.

candidateCellInfoListMN-EUTRA, candidateCellInfoListSN-EUTRA
Includes the MeasResultList3EUTRA as specified in TS 36.331 [10]. Contains information regarding cells that the master node or the source node suggests the target secondary eNB to consider configuring. These fields are only used in NE-DC.

configRestrictInfo
Includes fields for which SgNB is explictly indicated to observe a configuration restriction.

drx-ConfigMCG
This field contains the complete DRX configuration of the MCG. This field is only used in NR-DC.

drx-InfoMCG
This field contains the DRX long and short cycle configuration of the MCG. This field is used in (NG)EN-DC and NE-DC.

fr-InfoListMCG
Contains information of FR information of serving cells that include PCell and SCell(s) configured in MCG.

maxMeasFreqsSCG
Indicates the maximum number of NR inter-frequency carriers the SN is allowed to configure with PSCell for measurements.

maxMeasIdentitiesSCG-NR
Indicates the maximum number of allowed measurement identities that the SCG is allowed to configure.

maxNumberROHC-ContextSessionsSN
Indicates the maximum number of context sessions allowed to SN-terminated bearer, excluding context sessions that leave all headers uncompressed.

measuredFrequenciesMN
Used by MN to indicate a list of frequencies measured by the UE.

measGapConfig
Indicates the FR1 and perUE measurement gap configuration configured by MN.

measGapConfigFR2
Indicates the FR2 measurement gap configuration configured by MN.

measResultCellListSFTD
Indicates the SFTD measurements between the PCell and the NR PSCell.

measResultReportCGI, measResultReportCGI-EUTRA
Used by MN to provide SN with CGI-Info for the cell as per SN's request. In this version of the specification, the measResultReportCGI is used for (NG)EN-DC and NR-DC and the measResultReportCGI-EUTRA is used only for NE-DC.

measResultSCG-EUTRA
This field includes the MeasResultSCG-FailureMRDCIE as specified in TS 36.331 [10]. This field is only used in NE-DC.

measResultSFTD-EUTRA
SFTD measurement results between the PCell and the E-UTRA PScell in NE-DC. This field is only used in NE-DC.

TABLE 1-continued mcg-RB-Config
Contains all of the fields in the IE RadioBearerConfig used in MCG, used by the SN to support delta configuration to UE, for bearer type change between MN-terminated bearer with NR PDCP to SN-terminated bearer. It is also used to indicate the PDCP duplication related information for MN-terminated split bearer (whether duplication is configured and if so, whether it is initially activated) in SN Addition/Modification procedure. Otherwise, this field is absent.
mrdc-AssistanceInfo
Contains the IDC assistance information for MR-DC reported by the UE (see TS 36.331 [10]).
pdcch-BlindDetectionSCG
Indicates the maximum value of the reference number of cells for PDCCH blind detection allowed to be configured for the SCG.
p-maxEUTRA
Indicates the maximum total transmit power to be used by the UE in the E-UTRA cell group (see TS 36.104 [33]). This field is used in (NG)EN-DC and NE-DC.
p-maxNR-FR1
Indicates the maximum total transmit power to be used by the UE in the NR cell group across all serving cells in frequency range 1 (FR1) (see TS 38.104 [12]) the UE can use in NR SCG.
p-maxUE-FR1
Indicates the maximum total transmit power to be used by the UE across all serving cells in frequency range 1 (FR1).
ph-InfoMCG
Power headroom information in MCG that is needed in the reception of PHR MAC CE in SCG.
ph-SupplementaryUplink
Power headroom information for supplementary uplink. For UE in (NG)EN-DC, this field is absent.
ph-Type1or3
Type of power headroom for a serving cell in MCG (PCell and activated SCells). type1 refers to type 1 power headroom, type3 refers to type 3 power headroom. (See TS 38.321 [3]).
ph-Uplink
Power headroom information for uplink.
powerCoordination-FR1
Indicates the maximum power that the UE can use in FR1.
scgFailureInfo
Contains SCG failure type and measurement results. In case the sender has no measurement results available, the sender may include one empty entry (i.e. without any optional fields present) in measResultsPerMOList. This field is used in (NG)EN-DC and NR-DC.
scgFailureInfoEUTRA
Contains SCG failure type and measurement results of the EUTRA secondary cell group. This field is only used in NE-DC.
scg-RB-Config
Contains all of the fields in the IE RadioBearerConfig used in SCG, used to allow the target SN to use delta configuration to the UE, e.g. during SN change. The field is signalled upon change of SN. Otherwise, the field is absent. This field is also absent when master eNB uses full configuration option.
selectedBandEntiesMN
Indicates the position of a band entry selected by the MN, in the first band combination entry in allowedBC-ListMRDCIE. Each band entry in the subset is identified by its position in the bandlist of this BandCombinaiton.
The SN uses this information to determine which bands out of the NR band combinations in allowedBC-ListMRDC it can configure in SCG. This field is only used in NR-DC.
servCellIndexRangeSCG
Range of serving cell indices that SN is allowed to configure for SCG serving cells.
sourceConfigSCG
Includes all of the current SCG configurations used by the target SN to build delta configuration to be sent to UE, e.g. during SN change. The field contains the RRCReconfiguration message, i.e. including CellGroupConfig and measConfig. The field is signalled upon change of SN, unless MN uses full configuration option. Otherwise, the field is absent.
sourceConfigSCG-EUTRA
Includes the E-UTRA RRCConnectionReconfiguration message as specified in TS 36.331 [10]. In this version of the specification, the E-UTRA RRC message can only include the field scg-Configuration. In this version of the specification, this field is absent when master gNB uses full configuration option. This field is only used in NE-DC.
ue-CapabilityInfo
Contains the IE UE-CapabilityRAT-ContainerList supported by the UE (see NOTE 3). The field is signalled upon addition, modification or change of SN.

| BandCombinationInfo field descriptions |
| --- | allowedFeatureSetsList
Defines a subset of the entries in a FeatureSetCombination. Each index identifies a position in the FeatureSetCombination, which corresponds to one FeatureSetUplink Downlink for each band entry in the associated band combination.
bandCombinationIndex
The position of a band combination in the supportedBandCombinationList

| Conditional Presence | Explanation |
| --- | --- |
| SN-AddMod | The field is mandatory present upon SN addition and SN change. It is optionally present upon SN modification. Otherwise, the field is absent. |

NOTE 3:
The following table indicates per source RAT whether RAT capabilities are included or not in ue-CapabilityInfo.

| Source RAT | NR capabilities | E-UTRA capabilities | MR-DC capabilities |
| --- | --- | --- | --- |
| E-UTRA | Included | Not included | Included |

The SN addition procedure is initiated by the MN and is used to establish a UE context at the SN to provide resources from the SN to the UE. For bearers requiring SCG radio resources, this procedure is used to add at least the initial SCG serving cell of the SCG. This procedure can also be used to configure an SN-terminated MCG bearer (where no SCG configuration is needed). FIG. 5 is a reproduction of FIG. 10.2.2-1 from 3GPP Technical Specification (TS) 37.340 V15.6.0, which shows the SN addition procedure. Table 2 below includes excerpts from 3GPP TS 37.340 V15.6.0 describing steps 1-12 of FIG. 10.2.2-1, which is reproduced in FIG. 5.

TABLE 2

| | | |
|---|---|---|
| 1. | | The MN decides to request the target SN to allocate resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. In NGEN-DC and NR-DC, the MN always provides all the needed security information to the SN (even if no SN-terminated bearers are setup) to enable SRB3 to be setup based on SN decision. For MN-terminated bearer options that require Xn-U resources between the MN and the SN, the MN provides Xn-U UL TNL address information. For SN-terminated bearers, the MN provides a list of available DRB IDs. The S-NG-RAN node shall store this information and use it when establishing SN-terminated bearers. The SN may reject the request. For SN-terminated bearer options that require Xn-U resources between the MN and the SN, the MN provides in step 1 a list of QoS flows per PDU Sessions for which SCG resources are requested to be setup upon which the SN decides how to map QoS flows to DRB. |
| | NOTE 1: | For split bearers, MCG and SCG resources may be requested of such an amount, that the QoS for the respective QoS Flow is guaranteed by the exact sum of resources provided by the MCG and the SCG together, or even more. For MN-terminated split bearers, the MN decision is reflected in step 1 by the QoS Flow parameters signalled to the SN, which may differ from QoS Flow parameters received over NG. |
| | NOTE 2: | For a specific QoS flow, the MN may request the direct establishment of SCG and/or split bearers, i.e. without first having to establish MCG bearers. It is also allowed that all QoS flows can be mapped to SN-terminated bearers, i.e. there is no QoS flow mapped to an MN-terminated bearer. |
| 2. | | If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PSCell and other SCG SCells and provides the new SCG radio resource configuration to the MN within an SN RRC configuration message contained in the SN Addition Request Acknowledge message. In case of bearer options that require Xn-U resources between the MN and the SN, the SN provides Xn-U TNL address information for the respective DRB, Xn-U UL TNL address information for SN-terminated bearers, Xn-U DL TNL address information for MN-terminated bearers. For SN-terminated bearers, the SN provides the NG-U DL TNL address information for the respective PDU Session and security algorithm. If SCG radio resources have been requested, the SCG radio resource configuration is provided. |
| | NOTE 3: | In case of MN-terminated bearers, transmission of user plane data may take place after step 2. |
| | NOTE 4: | In case of SN-terminated bearers, data forwarding and the SN Status Transfer may take place after step 2. |
| | NOTE 5: | For MN-terminated NR SCG bearers for which PDCP duplication with CA is configured the MN allocates 2 separate Xn-U bearers. For SN-terminated NR MCG bearers for which PDCP duplication with CA is configured the SN allocates 2 separate Xn-U bearers. |
| 2a. | | For SN-terminated bearers using MCG resources, the MN provides Xn-U DL TNL address information in the Xn-U Address Indication message. |
| 3. | | The MN sends the MN RRC reconfiguration message to the UE including the SN RRC configuration message, without modifying it. |
| 4. | | The UE applies the new configuration and replies to MN with MN RRC reconfiguration complete message, including an SN RRC response message for SN, if needed. In case the UE is unable to comply with (part of) the configuration included in the MN RRC reconfiguration message, it performs the reconfiguration failure procedure. |
| 5. | | The MN informs the SN that the UE has completed the reconfiguration procedure successfully via SN Reconfiguration Complete message, including the SN RRC response message, if received from the UE. |
| 6. | | If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure. |
| 7. | | In case of SN-terminated bearers using RLC AM, the MN sends SN Status Transfer. |
| 8. | | In case of SN-terminated bearers using RLC AM, and dependent on the bearer characteristics of the respective QoS Flows, the MN may take actions to minimise service interruption due to activation of MR-DC (Data forwarding). |
| 9-12. | | For SN-terminated bearers, the update of the UP path towards the 5GC is performed via PDU Session Path Update procedure. |

The SN modification procedure may be initiated either by the MN or by the SN and be used to modify the current UP resource configuration (e.g., related to Protocol Data Unit (PDU) session, Quality of Service (QoS) flow, or Data Radio Bearer (DRB)) or to modify other properties of the UE context within the same SN. It may also be used to transfer an RRC message from the SN to the UE via the MN and the response from the UE via the MN to the SN (e.g., when SRB3 is not used). In NGEN-DC and NR DC, the RRC message is an NR message (i.e., RRCReconfiguration) whereas in NE-DC it is an E-UTRA message (i.e., RRC-ConnectionReconfiguration).

The SN modification procedure does not necessarily need to involve signaling towards the UE.

The MN uses the procedure to initiate configuration changes of the SCG within the same SN, including addition, modification, or release of the UP resource configuration. The MN uses this procedure to perform handover within the same MN while keeping the SN, when the SN needs to be involved (i.e., in NGEN-DC). The MN also uses the procedure to query the current SCG configuration (e.g., when delta configuration is applied in an MN-initiated SN change). The MN also uses the procedure to provide the SN Radio Link Failure (S-RLF) related information to the SN or to provide additional available DRB Identities (IDs) to be used for SN-terminated bearers. The MN may not use the procedure to initiate the addition, modification, or release of SCG Secondary Cells (SCells). The SN may reject the request, except if it concerns the release of the UP resource configuration, or if it is used to perform handover within the same MN while keeping the SN.

FIG. 6 is a reproduction of FIG. 10.3.2-1 from 3GPP TS 37.340 V15.6.0, which shows an example signaling flow for an MN-initiated SN modification procedure. Table 3 below includes excerpts from 3GPP TS 37.340 V15.6.0 describing the steps of FIG. 10.3.2-1 (which correspond to the steps of FIG. 6).

TABLE 3

| | |
|---|---|
| 1. | The MN sends the SN Modification Request message, which may contain user plane resource configuration related or other UE context related information, data forwarding address information (if applicable), PDU session level Network Slice info and the requested SCG configuration information, including the UE capabilities coordination result to be used as basis for the reconfiguration by the SN. In case a security key update in the SN is required, a new SN Security Key is included. |
| 2. | The SN responds with the SN Modification Request Acknowledge message, which may contain new SCG radio configuration information within an SN RRC reconfiguration message, and data forwarding address information (if applicable). |
| NOTE 1: | For MN-terminated NR SCG bearers to be setup for which PDCP duplication with CA is configured the MN allocates 2 separate Xn-U bearers For SN-terminated NR MCG bearers to be setup for which PDCP duplication with CA is configured the SN allocates 2 separate Xn-U bearers. |
| 2a. | For SN-terminated MCG bearers, the MN provides Xn-U DL TNL address information in the Xn-U Address Indication message. |
| 3/4. | The MN initiates the RRC reconfiguration procedure, including an SN RRC reconfiguration message. The UE applies the new configuration, synchronizes to the MN (if instructed, in case of intra-MN handover) and replies with MN RRC reconfiguration complete message, including an SN RRC response message, if needed. In case the UE is unable to comply with (part of) the configuration included in the MN RRC reconfiguration message, it performs the reconfiguration failure procedure. |
| 5. | Upon successful completion of the reconfiguration, the success of the procedure is indicated in the SN Reconfiguration Complete message. |
| 6. | If instructed, the UE performs synchronisation towards the PSCell of the SN as described in SN addition procedure. Otherwise, the UE may perform UL transmission after having applied the new configuration. |
| 7. | If PDCP termination point is changed for bearers using RLC AM, and when RRC full configuration is not used, the MN sends the SN Status transfer. |
| 8. | If applicable, data forwarding between MN and the SN takes place (FIG. 10.3.2-1 depicts the case where a user plane resource configuration related context is transferred from the MN to the SN). |
| 9. | The SN sends the Secondary RAT Data Usage Report message to the MN and includes the data volumes delivered to and received from the UE as described in clause 10.11.2. |
| NOTE 2: | The order the SN sends the Secondary RAT Data Usage Report message and performs data forwarding with MN is not defined. The SN may send the report when the transmission of the related QoS flow is stopped. |
| 10. | If applicable, a PDU Session path update procedure is performed. |

The SN uses the procedure to perform configuration changes of the SCG within the same SN, e.g., to trigger the modification/release of the UP resource configuration and to trigger Primary Secondary Cell (PSCell) changes (for example, when a new security key is required, or when the MN needs to perform Packet Data Convergence Protocol (PDCP) data recovery). The MN cannot reject the release request of the PDU session/QoS flows. The SN also uses the procedure to request the MN to provide more DRB IDs to be used for SN-terminated bearers, or to return DRB IDs used for SN-terminated bearers that are not needed any longer.

FIG. 7 is a reproduction of FIG. 10.3.2-2 from 3GPP TS 37.340 V15.6.0, which shows an example signaling flow for an SN-initiated SN Modification procedure. Table 4 below includes excerpts from 3GPP TS 37.340 V15.6.0 describing the steps of FIG. 10.3.2-2, which correspond to the steps of FIG. 7.

TABLE 4

| | |
|---|---|
| 1. | The SN sends the SN Modification Required message including an SN RRC reconfiguration message, which may contain user plane resource configuration related context, other UE context related information and the new radio resource configuration of SCG. In case of change of security key, the PDCP Change Indication indicates that an SN security key update is required. In case the MN needs to perform PDCP data recovery, the PDCP Change Indication indicates that PDCP data recovery is required.<br>The SN can decide whether the change of security key is required. |
| 2/3. | The MN-initiated SN Modification procedure may be triggered by SN Modification Required message, e.g. when an SN security key change needs to be applied. |
| NOTE 3: | For SN-terminated NR MCG bearers to be setup for which PDCP duplication with CA is configured the SN allocates 2 separate Xn-U bearers. |
| 4. | The MN sends the MN RRC reconfiguration message to the UE including the SN RRC reconfiguration message with the new SCG radio resource configuration. |
| 5. | The UE applies the new configuration and sends the MN RRC reconfiguration complete message, including an SN RRC response message, if needed. In case the UE is unable to comply with (part of) the configuration included in the MN RRC reconfiguration message, it performs the reconfiguration failure procedure. |
| 6. | Upon successful completion of the reconfiguration, the success of the procedure is indicated in the SN Modification Confirm message including the SN RRC response message, if received from the UE. |
| 7. | If instructed, the UE performs synchronisation towards the PSCell configured by the SN as described in SN Addition procedure. Otherwise, the UE may perform UL transmission directly after having applied the new configuration. |
| 8. | If PDCP termination point is changed for bearers using RLC AM, and when RRC full configuration is not used, the SN sends the MN Status transfer. |
| 9. | If applicable, data forwarding between MN and the SN takes place (FIG. 10.3.2-2 depicts the case where a user plane resource configuration related context is transferred from the SN to the MN). |
| 10. | The SN sends the Secondary RAT Data Usage Report message to the MN and includes the data volumes delivered to and received from the UE as described in clause 10.11.2. |
| NOTE 4: | The order the SN sends the Secondary RAT Data Usage Report message and performs data forwarding with MN is not defined. The SN may send the report when the transmission of the related QoS flow is stopped. |
| 11. | If applicable, a PDU Session path update procedure is performed. |

The SN-initiated SN modification procedure without MN involvement (which is not supported for NE-DC) is used to modify the configuration within SN in case no coordination with MN is required, including the addition/modification/release of SCG SCell and PSCell change (e.g., when the security key does not need to be changed and the MN does not need to be involved in PDCP recovery).

FIG. 8 is a reproduction of FIG. 10.3.2-3 from 3GPP TS 37.340 V15.6.0, which shows an example signaling flow for SN-initiated SN modification procedure without MN involvement. The SN can decide whether the random access procedure is required. Table 5 below includes excerpts from 3GPP TS 37.340 V15.6.0 describing the steps of FIG. 10.3.2-3, which correspond to the steps of FIG. 8.

TABLE 5

| | |
|---|---|
| 1. | The SN sends the SN RRC reconfiguration message to the UE through SRB3. |
| 2. | The UE applies the new configuration and replies with the SN RRC reconfiguration complete message. In case the UE is unable to comply with (part of) the configuration included in the SN RRC reconfiguration message, it performs the reconfiguration failure procedure. |
| 3. | If instructed, the UE performs synchronisation towards the PSCell of the SN as described in SN Addition procedure. Otherwise the UE may perform UL transmission after having applied the new configuration. |

Transfer of an NR RRC Message to/from the UE (when SRB3 is not used) is supported for all the MR-DC options. The SN initiates the procedure when it needs to transfer an NR RRC message to the UE and SRB3 is not used. FIG. 9 is a reproduction of FIG. 10.3.2-4 from 3GPP TS 37.340 V15.6.0, which shows an example signaling flow for transfer of an NR RRC message to/from the UE. Table 6 below includes excerpts from 3GPP TS 37.340 V15.6.0 describing the steps of FIG. 10.3.2-4, which correspond to the steps of FIG. 9.

TABLE 6

| | |
|---|---|
| 1. | The SN initiates the procedure by sending the SN Modification Required to the MN including the SN RRC reconfiguration message. |
| 2. | The MN forwards the SN RRC reconfiguration message to the UE including it in the RRC reconfiguration message. |
| 3. | The UE applies the new configuration and replies with the RRC reconfiguration complete message by including the SN RRC reconfiguration complete message. |

TABLE 6-continued

| | |
|---|---|
| 4. | The MN forwards the SN RRC response message, if received from the UE, to the SN by including it in the SN Modification Confirm message. |
| 5. | If instructed, the UE performs synchronisation towards the PSCell of the SN as described in SN Addition procedure. Otherwise the UE may perform UL transmission after having applied the new configuration. |

The SN release procedure may be initiated either by the MN or by the SN and is used to initiate the release of the UE context and relevant resources at the SN. The recipient node of this request can reject it (e.g., if an SN change procedure is triggered by the SN).

FIG. 10 is a reproduction of FIG. 10.4.2-1 from 3GPP TS 37.340 V15.6.0, which shows an example signaling flow for the MN-initiated SN release procedure. Table 7 below includes excerpts from 3GPP TS 37.340 V15.6.0 describing the steps of FIG. 10.4.2-1, which correspond to the steps of FIG. 10.

TABLE 7

| | |
|---|---|
| 1. | The MN initiates the procedure by sending the SN Release Request message. |
| 2. | The SN confirms SN Release by sending the SN Release Request Acknowledge message. If appropriate, the SN may reject SN Release, e.g., if the SN change procedure is triggered by the SN. |
| 2a. | When applicable, the MN provides forwarding address information to the SN. |
| NOTE 0: | The MN may send the Data Forwarding Address Indication message to provide forwarding address information before step 2. |
| 3/4. | If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure. |
| NOTE 1: | If data forwarding is applied, timely coordination between steps 1 and 2 may minimize gaps in service provision, this is however regarded to be an implementation matter. |
| 5. | If the released bearers use RLC AM, the SN sends the SN Status transfer. |
| 6. | Data forwarding from the SN to the MN takes place. |
| 7. | The SN sends the Secondary RAT Data Usage Report message to the MN and includes the data volumes delivered to and received from the UE as described in clause 10.11.2. |
| NOTE 1a: | The order the SN sends the Secondary RAT Data Usage Report message and performs data forwarding with MN is not defined. The SN may send the report when the transmission of the related QoS flow is stopped. |
| 8. | If applicable, the PDU Session path update procedure is initiated. |
| 9. | Upon reception of the UE Context Release message, the SN can release radio and C-plane related resource associated to the UE context. Any ongoing data forwarding may continue. |

FIG. 11 is a reproduction of FIG. 10.4.2-2 from 3GPP TS 37.340 V15.6.0, which shows an example signaling flow for the SN-initiated SN release procedure. Table 8 below includes excerpts from 3GPP TS 37.340 V15.6.0 describing the steps of FIG. 10.4.2-2, which correspond to the steps of FIG. 11.

TABLE 8

| | |
|---|---|
| 1. | The SN initiates the procedure by sending the SN Release Required message which does not contain any inter-node message. |
| 2. | If data forwarding is requested, the MN provides data forwarding addresses to the SN in the SN Release Confirm message. The SN may start data forwarding and stop providing user data to the UE as early as it receives the SN Release Confirm message. |
| 3/4. | If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure. |
| NOTE 2: | If data forwarding is applied, timely coordination between steps 2 and 3 may minimize gaps in service provision. This is however regarded as an implementation matter. |
| 5. | If the released bearers use RLC AM, the SN sends the SN Status transfer. |
| 6. | Data forwarding from the SN to the MN takes place. |
| 7. | The SN sends the Secondary RAT Data Usage Report message to the MN and includes the data volumes delivered to and received from the UE as described in clause 10.11.2. |
| NOTE 3: | The order the SN sends the Secondary RAT Data Usage Report message and performs data forwarding with MN is not defined. The SN may send the report when the transmission of the related QoS flow is stopped. |
| 8. | If applicable, the PDU Session path update procedure is initiated. |
| 9. | Upon reception of the UE Context Release message, the SN can release radio and C-plane related resource associated to the UE context. Any ongoing data forwarding may continue. |

The MN-initiated SN change procedure is used to transfer a UE context from the source SN to a target SN, and to change the SCG configuration in the UE from one SN to another. The SN change procedure always involves signaling over the MCG SRB towards the UE.

FIG. 12 is a reproduction of FIG. 10.5.2-1 from 3GPP TS 37.340 V15.6.0, which shows an example signaling flow for the SN change initiated by the MN. Table 9 below includes excerpts from 3GPP TS 37.340 V15.6.0 describing the steps of FIG. 10.5.2-1, which correspond to the steps of FIG. 12.

TABLE 9

| | |
|---|---|
| 1/2. | The MN initiates the SN change by requesting the target SN to allocate resources for the UE by means of the SN Addition procedure. The MN may include measurement results related to the target SN. If data forwarding is needed, the target SN provides data forwarding addresses to the MN. The target SN includes the indication of the full or delta RRC configuration. |
| NOTE 1: | The MN may send the SN Modification Request message (to the source SN) to request the current SCG configuration and allow provision of data forwarding related information before step 1. |
| 3. | If the allocation of target SN resources was successful, the MN initiates the release of the source SN resources including a Cause indicating SCG mobility. The Source SN may reject the release. If data forwarding is needed the MN provides data forwarding addresses to the source SN. If direct data forwarding is used for SN-terminated bearers, the MN provides data forwarding addresses as received from the target SN to source SN. Reception of the SN Release Request message triggers the source SN to stop providing user data to the UE and, if applicable, to start data forwarding. |
| 4/5. | The MN triggers the UE to apply the new configuration. The MN indicates the new configuration to the UE in the MN RRC reconfiguration message including the target SN RRC reconfiguration message. The UE applies the new configuration and sends the MN RRC reconfiguration complete message, including the SN RRC response message for the target SN, if needed. In case the UE is unable to comply with (part of) the configuration included in the MN RRC reconfiguration message, it performs the reconfiguration failure procedure. |
| 6. | If the RRC connection reconfiguration procedure was successful, the MN informs the target SN via SN Reconfiguration Complete message with the included SN RRC response message for the target SN, if received from the UE. |
| 7. | If configured with bearers requiring SCG radio resources the UE synchronizes to the target SN. |
| 8. | For SN-terminated bearers using RLC AM, the source SN sends the SN Status transfer, which the MN sends then to the target SN. |
| 9. | If applicable, data forwarding from the source SN takes place. It may be initiated as early as the source SN receives the SN Release Request message from the MN. |
| 10. | The source SN sends the Secondary RAT Data Usage Report message to the MN and includes the data volumes delivered to and received from the UE as described in clause 10.11.2. |
| NOTE 2: | The order the SN sends the Secondary RAT Data Usage Report message and performs data forwarding with MN is not defined. The SN may send the report when the transmission of the related QoS flow is stopped. |
| 11-15. | If the user plane resource configuration was terminated at the source SN, path update procedure is triggered by the MN. |
| 16. | Upon reception of the UE Context Release message, the source SN can release radio and C-plane related resource associated to the UE context. Any ongoing data forwarding may continue |

The SN-initiated SN change procedure is used to transfer a UE context from the source SN to a target SN, and to change the SCG configuration in the UE from one SN to another.

FIG. 13 is a reproduction of FIG. 10.5.2-2 from 3GPP TS 37.340 V15.6.0, which shows an example signaling flow for the SN change initiated by the SN. Table 10 below includes excerpts from 3GPP TS 37.340 V15.6.0 describing the steps of FIG. 10.5.2-2, which correspond to the steps of FIG. 13.

TABLE 10

| | |
|---|---|
| 1. | The source SN initiates the SN change procedure by sending the SN Change Required message, which contains a candidate target node ID and may include the SCG configuration (to support delta configuration) and measurement results related to the target SN. |
| 2/3. | The MN requests the target SN to allocate resources for the UE by means of the SN Addition procedure, including the measurement results related to the target SN received from the source SN. If data forwarding is needed, the target SN provides data forwarding addresses to the MN. The target SN includes the indication of the full or delta RRC configuration. |
| 4/5. | The MN triggers the UE to apply the new configuration. The MN indicates the new configuration to the UE in the MN RRC reconfiguration message including the SN RRC reconfiguration message generated by the target SN. The UE applies the new configuration and sends the MN RRC reconfiguration complete message, including the SN RRC response message for the target SN, if needed. In case the UE is unable to comply with (part of) the configuration included in the MN RRC reconfiguration message, it performs the reconfiguration failure procedure. |
| 6. | If the allocation of target SN resources was successful, the MN confirms the change of the source SN. If data forwarding is needed the MN provides data forwarding addresses to the source SN. If direct data forwarding is used for SN-terminated bearers, the MN provides data forwarding addresses as received from the target SN to source SN. Reception of the SN Change Confirm message triggers the source SN to stop providing user data to the UE and, if applicable, to start data forwarding. |

TABLE 10-continued

| | |
|---|---|
| 7. | If the RRC connection reconfiguration procedure was successful, the MN informs the target SN via SN Reconfiguration Complete message with the included SN RRC response message for the target SN, if received from the UE. |
| 8. | The UE synchronizes to the target SN. |
| 9. | For SN-terminated bearers using RLC AM, the source SN sends the SN Status transfer, which the MN sends then to the target SN. |
| 10. | If applicable, data forwarding from the source SN takes place. It may be initiated as early as the source SN receives the SN Change Confirm message from the MN. |
| 11. | The source SN sends the Secondary RAT Data Usage Report message to the MN and includes the data volumes delivered to and received from the UE as described in clause 10.11.2. |
| NOTE 3: | The order the SN sends the Secondary RAT Data Usage Report message and performs data forwarding with MN/target SN is not defined. The SN may send the report when the transmission of the related QoS flow is stopped. |
| 12-16. | If the user plane resource configuration was terminated at the source SN, path update procedure is triggered by the MN. |
| 17. | Upon reception of the UE Context Release message, the source SN can release radio and C-plane related resource associated to the UE context. Any ongoing data forwarding may continue. |

In MR-DC, a PSCell change does not always require a security key change. If a security key change is required, this is performed through a synchronous SCG reconfiguration procedure towards the UE involving random access on PSCell and a security key change, during which the Medium Access Control (MAC) entity configured for SCG is reset and the Radio Link Control (RLC) configured for SCG is re-established regardless of the bearer type(s) established on SCG. For SN-terminated bearers, PDCP is re-established. In all MR-DC options, to perform this procedure within the same SN, the SN modification procedure as described in clause 10.3 of 3GPP TS 37.340 V15.6.0 is used, setting the PDCP Change Indication to indicate that a S-$K_{gNB}$ (for EN-DC, NGEN-DC, and NR-DC) or S-$K_{eNB}$ (for NE-DC) update is required when the procedure is initiated by the SN or including the SgNB Security Key/SN Security Key when the procedure is initiated by the MN.

If a security key change is not required (only possible in EN-DC, NGEN-DC, and NR-DC), this is performed through a synchronous SCG reconfiguration procedure without security key change towards the UE involving random access on PSCell, during which the MAC entity configured for SCG is reset and the RLC configured for SCG is re-established regardless of the bearer type(s) established on SCG. For bearers using RLC Acknowledged Mode (AM) mode, PDCP data recovery applies; for bearers using RLC Unacknowledged Mode (UM), no action is performed in PDCP; while for SRBs, the PDCP discards all stored Service Data Units (SDUs) and PDUs. Unless MN-terminated SCG or split bearers are configured, this does not require MN involvement. In this case, if location information was requested for the UE, the SN informs the MN about the PSCell change (as part of location information) using the SN-initiated SN modification procedure independently from the reconfiguration of the UE. In case of MN-terminated SCG or split bearers, the SN-initiated SN modification procedure as described in clause 10.3 of 3GPP TS 37.340 V15.6.0 is used, setting the PDCP Change Indication to indicate that a PDCP data recovery is required.

Inter-MN handover, with or without MN-initiated SN change, is used to transfer UE context data from a source MN to a target MN while the UE context at the SN is kept or moved to another SN. During an Inter-MN handover, the target MN decides whether to keep or change the SN (or release the SN, as described in clause 10.8 of 3GPP TS 37.340 V15.6.0). Only intra-RAT inter-MN handover, with or without SN change, is supported (e.g., no transition from NGEN-DC to NR-DC).

FIG. 14 is a reproduction of FIG. 10.7.2-1 from 3GPP TS 37.340 V15.6.0, which shows an example signaling flow for inter-MN handover with or without MN-initiated SN change. Table 11 below includes excerpts from 3GPP TS 37.340 V15.6.0 describing the steps of FIG. 10.7.2-1, which correspond to the steps of FIG. 14.

TABLE 11

| | |
|---|---|
| NOTE 1: | For an Inter-Master Node handover without Secondary Node change, the source SN and the target SN shown in FIG. 10.7.2-1 are the same node. |
| 1. | The source MN starts the handover procedure by initiating the Xn Handover Preparation procedure including both MCG and SCG configuration. The source MN includes the source SN UE XnAP ID, SN ID and the UE context in the source SN in the Handover Request message. |
| NOTE 2: | The source MN may send the SN Modification Request message (to the source SN) to request the current SCG configuration and allow provision of data forwarding related information before step 1. |
| 2. | If the target MN decides to keep the source SN, the target MN sends SN Addition Request to the SN including the SN UE XnAP ID as a reference to the UE context in the SN that was established by the source MN. If the target MN decides to change the SN, the target MN sends the SN Addition Request to the target SN including the UE context in the source SN that was established by the source MN. |
| 3. | The (target) SN replies with SN Addition Request Acknowledge. The (target) SN may include the indication of the full or delta RRC configuration. |
| 4. | The target MN includes within the Handover Request Acknowledge message the MN RRC reconfiguration message to be sent to the UE to perform the handover, and may also provide forwarding addresses to the source MN. If PDU session split is performed in the target MN node during handover procedure, more than one data forwarding addresses corresponding to each node should be included in Handover Request Acknowledge message. The target MN indicates to the source MN that the UE context in the SN is kept if the target MN and the SN decided to keep the UE context in the SN in step 2 and step 3. |

TABLE 11-continued

| | |
|---|---|
| 5a/5b. | The source MN sends SN Release Request message to the (source) SN including a Cause indicating MCG mobility. The (source) SN acknowledges the release request. The source MN indicates to the (source) SN that the UE context in SN is kept, if it receives the indication from the target MN. If the indication as the UE context kept in SN is included, the SN keeps the UE context. |
| 5c. | The source MN sends XN-U Address Indication message to the (source) SN to transfer data forwarding information. More than one data forwarding addresses may be provided if the PDU session is split in the target node. |
| 6. | The source MN triggers the UE to perform handover and apply the new configuration. |
| 7/8. | The UE synchronizes to the target MN and replies with MN RRC reconfiguration complete message. |
| 9. | If configured with bearers requiring SCG radio resources, the UE synchronizes to the (target) SN. |
| 10. | If the RRC connection reconfiguration procedure was successful, the target MN informs the (target) SN via SN Reconfiguration Complete message. |
| 11a. | The source SN sends the Secondary RAT Data Usage Report message to the source MN and includes the data volumes delivered to and received from the UE over the NR/E-UTRA radio as described in clause 10.11.2. |
| NOTE 2a: | The order the source SN sends the Secondary RAT Data Usage Report message and performs data forwarding with MN/target SN is not defined. The SN may send the report when the transmission of the related QoS is stopped. |
| 11b. | The source MN sends the Secondary RAT Report message to AMF to provide information on the used NR/E-UTRA resource. |
| 12. | For bearers using RLC AM, SN Status transfer message may be transferred from source SN to source MN, from source MN to target MN and from target MN to target SN. |
| 13. | Data forwarding from the source node takes place. If the SN is kept, data forwarding may be omitted for SCG bearers and SCG split bearers. |
| 14-17. | The target MN initiates the Path Switch procedure. If the target MN includes multiple DL TEIDs for one PDU session in the Path Switch Request message, multiple UL TEID of the UPF for the PDU session should be included in the Path Switch Ack message in case there is TEID update in UPF. |
| NOTE 3: | If new UL TEIDs of the UPF for SN are included, the target MN performs MN-initiated SN Modification procedure to provide them to the SN. |
| 18. | The target MN initiates the UE Context Release procedure towards the source MN. |
| 19. | Upon reception of the UE Context Release message from source MN, the (source) SN can release C-plane related resource associated to the UE context towards the source MN. Any ongoing data forwarding may continue. The SN shall not release the UE context associated with the target MN if the indication was included in the SN Release Request message in step 5. |

The MN to NG-eNB/gNB change procedure is used to transfer UE context data from a source MN/SN to a target NG-eNB/gNB. Both the cases where the source MN and the target node belong to the same RAT (i.e., they are both NG-eNBs or both gNBs) and the cases where the source MN and the target node belong to different RATs are supported. Inter-system handover from the NG-eNB/gNB MN to the eNB is also supported.

FIG. 15 is a reproduction of FIG. 10.8.2-1 from 3GPP TS 37.340 V15.6.0, which shows an example signaling flow for the MN to NG-eNB/gNB change procedure. Table 12 below includes excerpts from 3GPP TS 37.340 V15.6.0 describing the steps of FIG. 10.8.2-1, which correspond to the steps of FIG. 15.

TABLE 12

| | |
|---|---|
| 1. | The source MN starts the MN to ng-eNB/gNB Change procedure by initiating the Xn Handover Preparation procedure, including both MCG and SCG configuration. |
| NOTE 1: | The source MN may send the SN Modification Request message (to the source SN) to request the current SCG configuration and allow provision of data forwarding related information before step 1. |
| 2. | The target ng-eNB/gNB includes the field in HO command which releases the SCG configuration, and may also provide forwarding addresses to the source MN. |
| 3. | If the resource allocation of target ng-eNB/gNB was successful, the MN initiates the release of the source SN resources towards the source SN including a Cause indicating MCG mobility. The SN acknowledges the release request. If data forwarding is needed, the MN provides data forwarding addresses to the source SN. Reception of the SN Release Request message triggers the source SN to stop providing user data to the UE and, if applicable, to start data forwarding. |
| 4. | The MN triggers the UE to perform HO and apply the new configuration. Upon receiving the new configuration, the UE releases the entire SCG configuration. |
| 5/6. | The UE synchronizes to the target ng-eNB/gNB. |
| 7. | For SN-terminated bearers using RLC AM, the SN sends the SN Status transfer, which the source MN sends then to the target ng-eNB/gNB. |
| 8. | If applicable, data forwarding from the source SN takes place. It may start as early as the source SN receives the SN Release Request message from the MN. |
| 9a. | The source SN sends the Secondary RAT Data Usage Report message to the source MN and includes the data volumes delivered to and received from the UE as described in clause 10.11.2. |
| NOTE 2: | The order the SN sends the Secondary RAT Data Usage Report message and performs data forwarding with MN is not defined. The SN may send the report when the transmission of the related QoS flow is stopped. |
| 9b. | The source MN sends the Secondary RAT Report message to AMF to provide information on the used NR/E-UTRA resource. |
| 10-14. | The target ng-eNB/gNB initiates the Path Switch procedure. |

TABLE 12-continued

| 15. | The target ng-eNB/gNB initiates the UE Context Release procedure towards the source MN. |
| 16. | Upon reception of the UE Context Release message from MN, the source SN can release radio and C-plane related resource associated to the UE context. Any ongoing data forwarding may continue. |

The NG-eNB/gNB to MN change procedure is used to transfer UE context data from a source NG-eNB/gNB to a target MN that adds an SN during the handover. Only the cases where the source node and the target MN belong to the same RAT (i.e., they are both NG-eNBs or both gNBs) are supported.

FIG. 16 is a reproduction of FIG. 10.9.2-1 from 3GPP TS 37.340 V15.6.0, which shows an example signaling flow for NG-eNB/gNB to MN change. Table 13 below includes excerpts 3GPP TS 37.340 V15.6.0 describing the steps of FIG. 10.9.2-1, which correspond to the steps of FIG. 16.

TABLE 13

| 1. | The source ng-eNB/gNB starts the handover procedure by initiating the Xn Handover Preparation procedure. |
| 2. | The target MN sends SN Addition Request to the target SN. |
| 3. | The target SN replies with SN Addition Request Acknowledge. If data forwarding is needed, the target SN provides forwarding addresses to the target MN. |
| 4. | The target MN includes within the Handover Request Acknowledge message the SN RRC reconfiguration message to be sent to the UE that includes the SCG configuration to perform the handover, and may also provide forwarding addresses to the source ng-eNB/gNB. |
| 5. | The source ng-eNB/gNB triggers the UE to perform handover and apply the new configuration. |
| 6/7. | The UE synchronizes to the target MN and replies with MN RRC reconfiguration complete message including the SN RRC reconfiguration complete message. |
| 8. | If configured with bearers requiring SCG radio resources, the UE synchronizes to the target SN. |
| 9. | If the RRC connection reconfiguration procedure was successful, the target MN informs the target SN via SN Reconfiguration Complete message. |
| 10. | For bearers using RLC AM, the source ng-eNB/gNB sends the SN Status transfer to the target MN. |
| 11. | Data forwarding from the source ng-eNB/gNB takes place. |
| 12-15. | The target MN initiates the PDU Session Path Switch procedure. |
| NOTE: | If new UL TEIDs of the UPF are included, the target MN performs MN-initiated SN Modification procedure to provide them to the target SN. |
| 16. | The target MN initiates the UE Context Release procedure towards the source ng-eNb/gNB. |

Cellular Intelligent Transport Systems (C-ITS) aim to define a new cellular eco-system for the delivery of vehicular services and their dissemination. Such eco-system includes both short-range and long-range V2X service transmissions, as depicted in FIG. 17. In particular, short-range communication involves transmissions over the Device-to-Device (D2D) link (also defined as Sidelink (SL) or PC5 interface in 3GPP) towards other vehicular UEs or Road Side Units (RSUs). On the other hand, for long-range transmission, it considers the transmission over the Uu interface between a UE and a base station, in which case packets may be disseminated to different Intelligent Transport Systems (ITS) service providers, which could be road traffic authorities, road operators, automotive Original Equipment Manufacturers (OEMs), cellular operators, etc.

When it comes to the SL interface, the first standardization effort in 3GPP dates back to Release (Rel) 12, targeting public safety use cases. Since then, a number of enhancements have been introduced with the objective to enlarge the use cases that could benefit from the D2D technology. Particularly, in LTE Rel-14 and Rel-15, the extensions for the D2D work consists of supporting V2X communication, including any combination of direct communication between vehicles (Vehicle-to-Vehicle (V2V)), pedestrians (Vehicle-to-Pedestrian (V2P)), and infrastructure (Vehicle-to-Infrastructure (V2I)).

In RAN #80, a new study item named "Study on NR V2X" was approved to study the enhancement to support advanced V2X services beyond services supported in LTE Rel-15 V2X. One of the objectives for NR V2X design is to study technical solutions for QoS management of the radio interface including both Uu (i.e., network-to-vehicle UE communication) and SL (i.e., vehicle UE-to-vehicle UE communication) used for V2X operations.

While LTE V2X mainly aims at traffic safety services, NR V2X has a much broader scope that includes not only basic safety services, but also targets non-safety applications, such as extended sensor/data sharing between vehicles, with the objective to strengthen the perception of the surrounding environment of vehicles. Hence, a new set of applications have been captured in TR 22.886 V16.2.0, such as advanced driving, vehicles platooning, cooperative maneuvers between vehicles, and remote driving that would require enhanced NR systems and new NR SL framework.

In this new context, the expected requirements to meet the needed data rate, capacity, reliability, latency, communication range, and speed are made more stringent. Additionally, both communication interfaces, PC5 and Uu, could be used to support the advanced V2X use cases, taking into account radio conditions and the environment where the enhanced V2X (eV2X) scenario takes place. For example, given the variety of services that can be transmitted over the SL, a robust QoS framework which takes into account the different performance requirements of the different V2X services seems to be needed. Additionally, NR protocols to handle more robust and reliable communication should be designed. All of these issues are currently under the investigation of 3GPP in NR Rel-16.

In NR, an SL QoS flow model is adopted. At the Non-Access Stratum (NAS) layer, a UE maps one V2X packet into the corresponding SL QoS flow and then maps to an SL radio bearer at the Service Data Adaptation Protocol (SDAP) layer.

In NR, an SL Radio Bearer (SLRB) configuration, including the QoS flow to SLRB mapping, is either preconfigured or configured by the network when the UE is in coverage. For instance, as shown in FIG. 18, which illustrates an NR SLRB configuration provided by the network, when the UE wants to establish a new SL QoS flow/SLRB for a new service, it can send a request to the associated gNB. The request can include the QoS information of the service. The gNB then determines the appropriate SLRB configuration to support such SL QoS flow. After receiving the SLRB configuration from the gNB, the UE establishes the local SLRB accordingly and prepares for data transmission over the SL. Note that to enable successful reception at the reception (RX) UE side, transmission (TX) UE might have to inform RX UE regarding necessary parameters (e.g., sequence number space for PDCP/RLC) before the data transmission starts.

RRC operation depends on the UE specific states. A UE is in either RRC_CONNECTED state, RRC_INACTIVE state, or RRC_IDLE state. The different RRC states have different amounts of radio resources associated with them that the UE may use in a given specific state. In RRC_INACTIVE and RRC_IDLE state, UE controlled mobility based on network configuration is adopted (i.e., the UE acquires System Information Block (SIB), performs neighboring cell measurements and cell selection or re-selection, and monitors a paging occasion). An inactive UE stores the UE inactive Access Stratum (AS) context and performs RAN-based Notification Area (RNA) updates.

In RRC_CONNECTED state, however, network-controlled mobility is performed. In fact, the RAN node can receive paging assistance information related to potential paging triggers, such as QoS flows or signaling, from the 5G CN. The UE is thus known by the network at the node/cell level and the UE specific bearer is established upon which UE specific data and/or control signaling could be communicated. For example, the RAN can configure UE-specific RNAs that make it possible to reduce the total signaling load by configuring small RNAs for stationary UEs (optimized for low paging load) and, especially, larger RNAs for moving UEs (optimized for vehicular UEs).

Furthermore, if, e.g., there is no traffic transmission and/or reception for a certain timer period, the network can initiate the RRC connection release procedure to transmit a UE in RRC_CONNECTED to RRC_IDLE, or to RRC_INACTIVE if SRB2 and at least one DRB is setup in RRC_CONNECTED.

There are two different Resource Allocation (RA) procedures for V2X on SL: network-controlled RA (so called "mode 3" in LTE and "mode 1" in NR) and autonomous RA (so called "mode 4" in LTE and "mode 2" in NR). The transmission resources are selected within a resource pool which is predefined or configured by the network.

With network-controlled RA, the NG-RAN is in charge of scheduling SL resource(s) to be used by the UE for SL transmission(s). The UE sends an SL Buffer Status Report (BSR) to the network to inform about SL data available for transmission in the SL buffers associated with the MAC entity. The network then signals the resource allocation to the UE using downlink control information (DCI). Network-controlled (or mode 1) RA may be realized via dynamic scheduling signalling via a Physical Downlink Control Channel (PDCCH), or by semi-persistent scheduling in which the gNB provides one or more configured SL grants. Both type 1 and type 2 configured SL grants are supported.

With autonomous RA, each device independently decides which SL radio resources to use for SL operations, based on, e.g., sensing. For both RA modes, an SL Control Information (SCI) is transmitted on a Physical Sidelink Control Channel (PSCCH) to indicate the assigned SL resources for the Physical Sidelink Shared Channel (PSSCH). Unlike network-controlled RA, which can only be performed when the UE is in RRC_CONNECTED state, autonomous RA (or mode 2) can be performed both when the UE is in RRC_CONNECTED mode and when the UE is in INACTIVE/IDLE state, and also when the UE is under Uu coverage and out-of-coverage. In particular, when the UE is in RRC_CONNECTED mode, the SL resource pool can be configured with dedicated RRC signalling, while for IDLE/INACTIVE mode operations, the UE shall rely on the SL resource pool provisioned in broadcasting signal, i.e., SIB.

Currently, as part of the NR V2X study item, 3GPP is investigating the possible extension of such mode 2. For example, 3GPP is considering the possibility of introducing a new UE functionality, in which a UE under certain conditions (e.g., for groupcast SL communication) is allowed to provision other UEs with a mode 2 pool to be used for SL communication (e.g., for SL communication within a group of UEs, such as a platoon of vehicles).

Configured grant is supported for NR SL, for both type 1 and type 2. With configured grant, the gNB can allocate SL resources for multiple (periodical) transmissions to the UE. Type 1 configured grant is configured and activated directly via dedicated RRC signaling, while type 2 configured grant is configured via dedicated RRC signaling, but only activated/released via DCI transmitted on PDCCH.

SUMMARY

Systems and methods are disclosed herein for exchanging Sidelink (SL) User Equipment (UE) context and configurations between a Master Node (MN) and a Secondary Node (SN) SN, e.g., in normal MR-DC connectivity operations. Embodiments of a method performed by a first network node are disclosed. In some embodiments, the method comprises sending, to a second network node, SL information associated with a particular SL UE. In some embodiments, the first network node comprises a base station that operates in accordance with a first radio access technology, the second network node comprises a base station that operates in accordance with a second radio access technology, and the SL UE operates in a dual connectivity mode in which one of the first network node and the second network node comprises an MN of the SL UE and the other one of the first network node and the second network node comprises an SN of the SL UE. Some such embodiments provide that the first network node comprises an enhanced or evolved Node B (eNB) and the second network node comprises a New Radio (NR) base station (gNB). In some such embodiments, the first network node comprises a gNB, and the second network node comprises an eNB.

In some embodiments, the SL information associated with the particular SL UE comprises SL UE context information of the particular SL UE, one or more SL configurations of the particular SL UE, or both the SL UE context information of the particular SL UE and the one or more SL configurations of the particular SL UE. Some embodiments provide that the method further comprises obtaining information that indicates what SL related information is to be included in the SL information sent to the second network node. In some such embodiments, the information that indicates what SL related information is to be included in the SL information sent to the second network node is included in SL Quality of Service (QoS) flow and SL Radio Bearer (SLRB) configuration information for the particular SL UE, a SidelinkUE-Information message for the particular SL UE, a UEAssistanceInformation message for the particular SL UE, an SL configured grant for the particular SL UE, information regarding Transmission/Reception (TX/RX), resource pools for the particular SL UE, or SL UE capabilities of the particular SL UE.

In some embodiments, sending the SL information comprises sending the SL information to the second network node during an SN addition procedure, during an SN modification procedure, or during an SN change procedure. According to some embodiments, sending the SL information comprises sending the SL information via one or more inter-node messages. In some such embodiments, the one or more inter-node messages comprise one or more Radio Resource Control (RRC) messages.

Embodiments of a first network node for a cellular communications system are also disclosed. In some embodiments, the first network node is adapted to send, to a second network node, SL information associated with a particular SL UE. According to some embodiments, the first network node is further adapted to perform any of the steps attributed to the first network node in the above-disclosed methods.

Embodiments of a first network node for a cellular communications system are additionally disclosed. In some embodiments, the first network node comprises a network interface, and processing circuitry associated with the network interface. The processing circuitry is configured to cause the first network node to send, to a second network node, SL information associated with a particular SL UE. Some embodiments provide that the processing circuitry is further configured to cause the first network node to perform any of the steps attributed to the first network node in the above-disclosed methods.

Embodiments of a method performed by a second node are also disclosed. In some embodiments, the method comprises receiving, from a first network node, SL information associated with a particular SL UE. In some embodiments, the first network node comprises a base station that operates in accordance with a first radio access technology, the second network node comprises a base station that operates in accordance with a second radio access technology, and the SL UE operates in a dual connectivity mode in which one of the first network node and the second network node comprises an MN of the SL UE and the other one of the first network node and the second network node comprises an SN of the SL UE. In some such embodiments, the first network node comprises an eNB, and the second network node comprises a gNB. Some such embodiments provide that the first network node comprises a gNB, and the second network node comprises an eNB.

In some embodiments, the SL information associated with the particular SL UE comprises SL UE context information of the particular SL UE, one or more SL configurations of the particular SL UE, or both the SL UE context information of the particular SL UE and the one or more SL configurations of the particular SL UE. Some embodiments provide that receiving the SL information comprises receiving the SL information from the first network node during an SN addition procedure, during an SN modification procedure, or during an SN change procedure. According to some embodiments, receiving the SL information comprises receiving the SL information via one or more inter-node messages. In some such embodiments, the one or more inter-node messages comprise one or more RRC messages. According to some embodiments, the method further comprises performing one or more actions based on the SL information.

Embodiments of a second network node for a cellular communications system are additionally disclosed. In some embodiments, the second network node is adapted to receive, from a first network node, SL information associated with a particular SL UE. In some embodiments, the second network node is further adapted to perform any of the steps attributed to the second network node in the above-disclosed methods.

Embodiments of a second network node for a cellular communications system are also disclosed. In some embodiments, the second network node comprises a network interface, and processing circuitry associated with the network interface. The processing circuitry is configured to cause the second network node to receive, from a first network node, SL information associated with a particular SL UE. In some embodiments, the processing circuitry is further configured to cause the second network node to perform any of the steps attributed to the second network node in the above-disclosed methods.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 is a reproduction of FIG. 10.3.2-3 from 3GPP TS 37.340 V15.6.0, which shows an example signaling flow for an SN-initiated SN modification procedure without MN involvement;

FIG. 9 is a reproduction of FIG. 10.3.2-4 from 3GPP TS 37.340 V15.6.0, which shows an example signaling flow for transfer of an NR Radio Resource Control (RRC) message to/from the User Equipment (UE);

DETAILED DESCRIPTION

Figure 1:
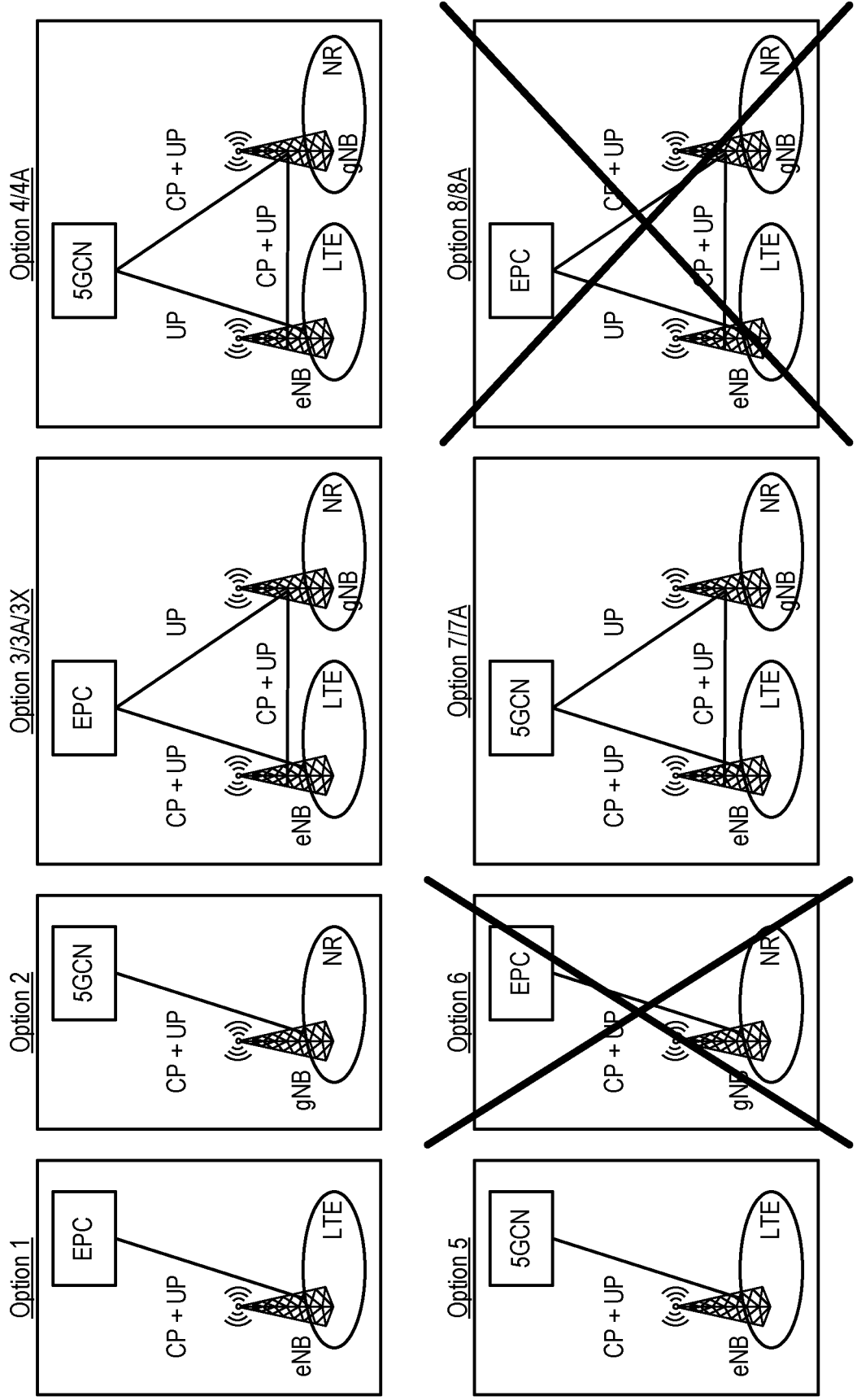
FIG. 1 illustrates different options for deploying a Fifth Generation (5G) New Radio (NR) network with or without interworking with Long Term Evolution (LTE) (also referred to as Evolved Universal Terrestrial Radio Access (E-UTRA)) and Evolved Packet Core (EPC)
Figure 2:
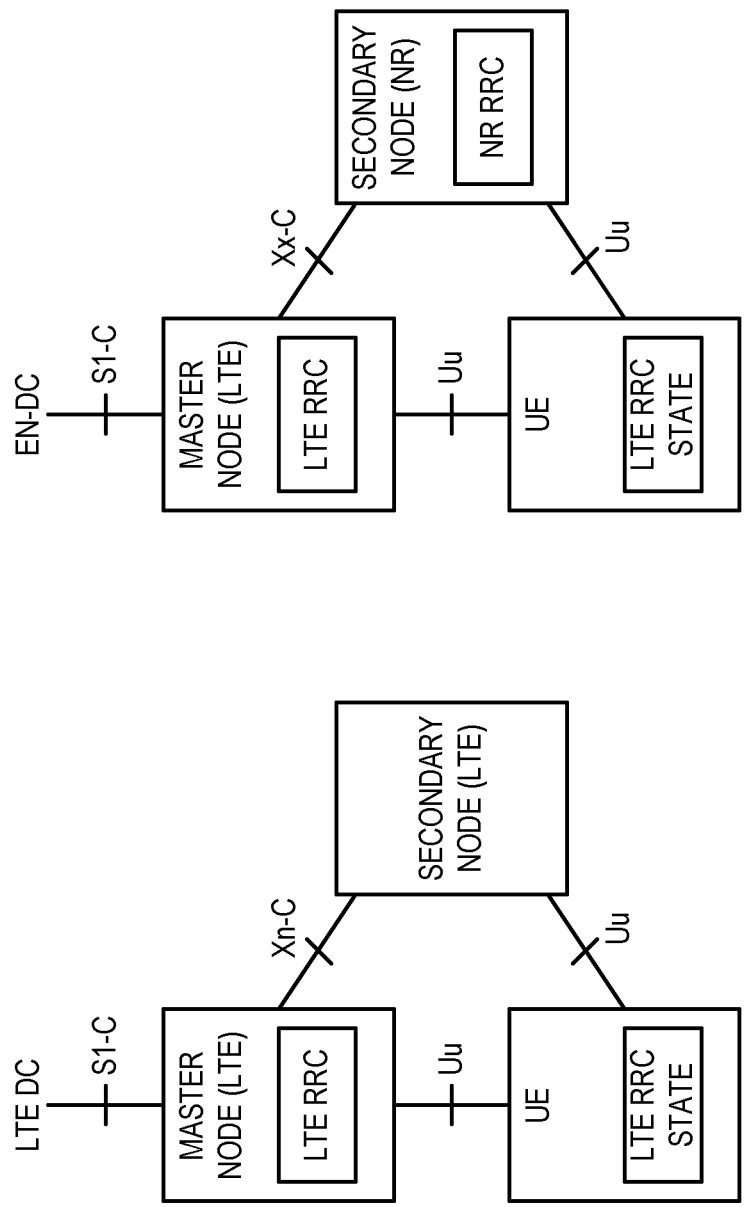
FIG. 2 shows the schematic Control Plane (CP) architecture for Dual Connectivity (DC) in LTE DC and E-UTRA NR DC (EN-DC)
Figure 3:
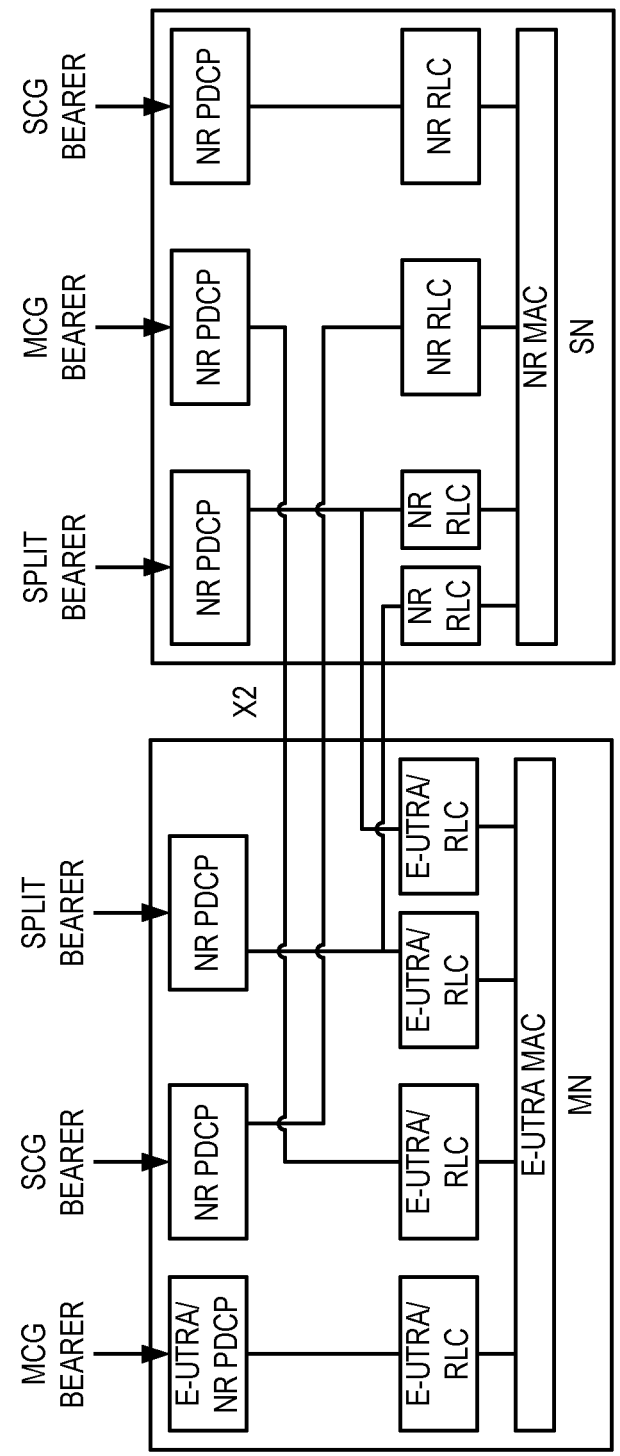
FIG. 3 illustrates network side protocol termination options for Master Cell Group (MCG), Secondary Cell Group (SCG), and split bearers in Multi-Radio DC (MR-DC) with EPC (EN-DC)
Figure 4:
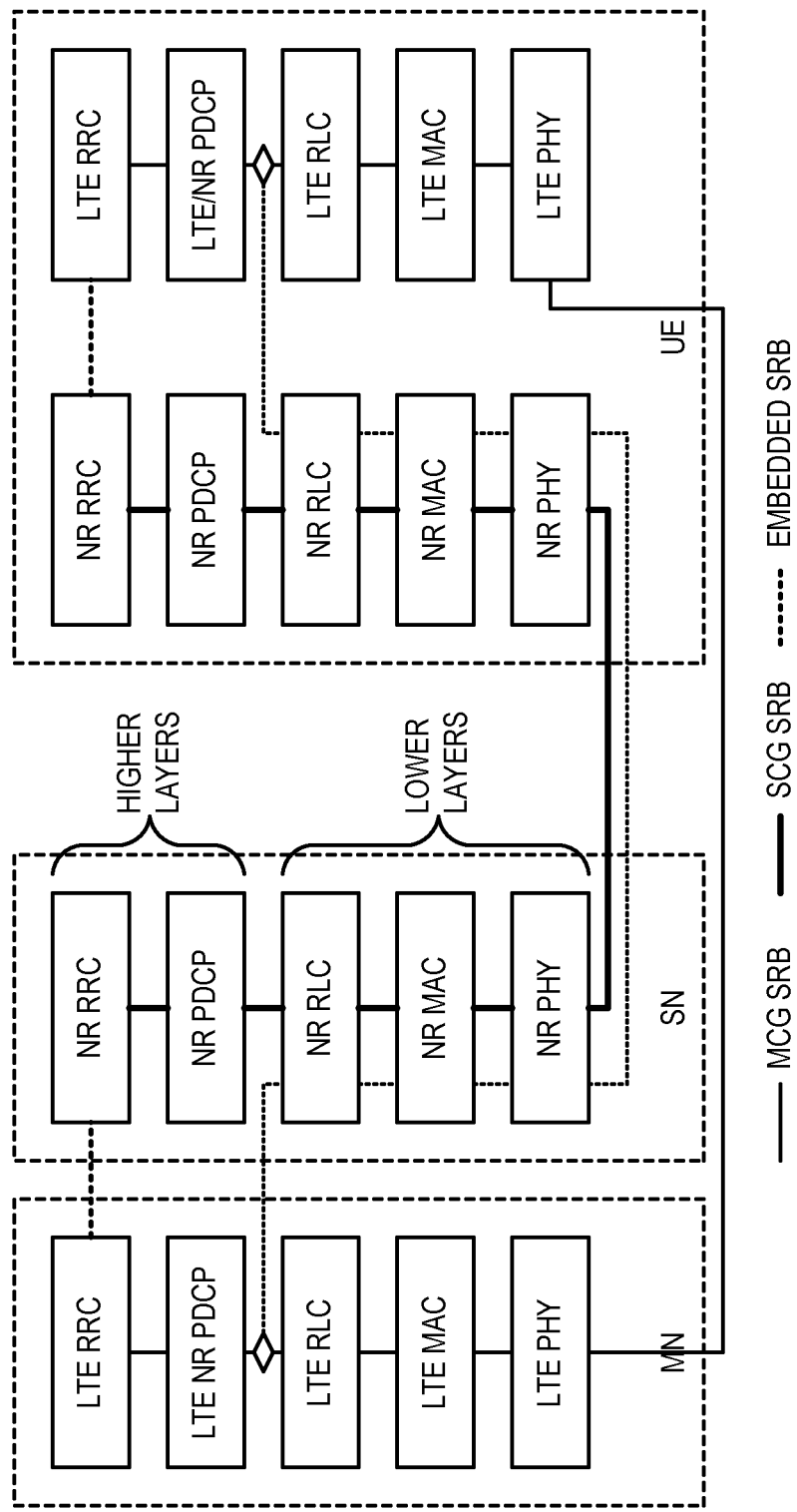
FIG. 4 illustrates a network architecture for CP in EN-DC.
Figure 5:
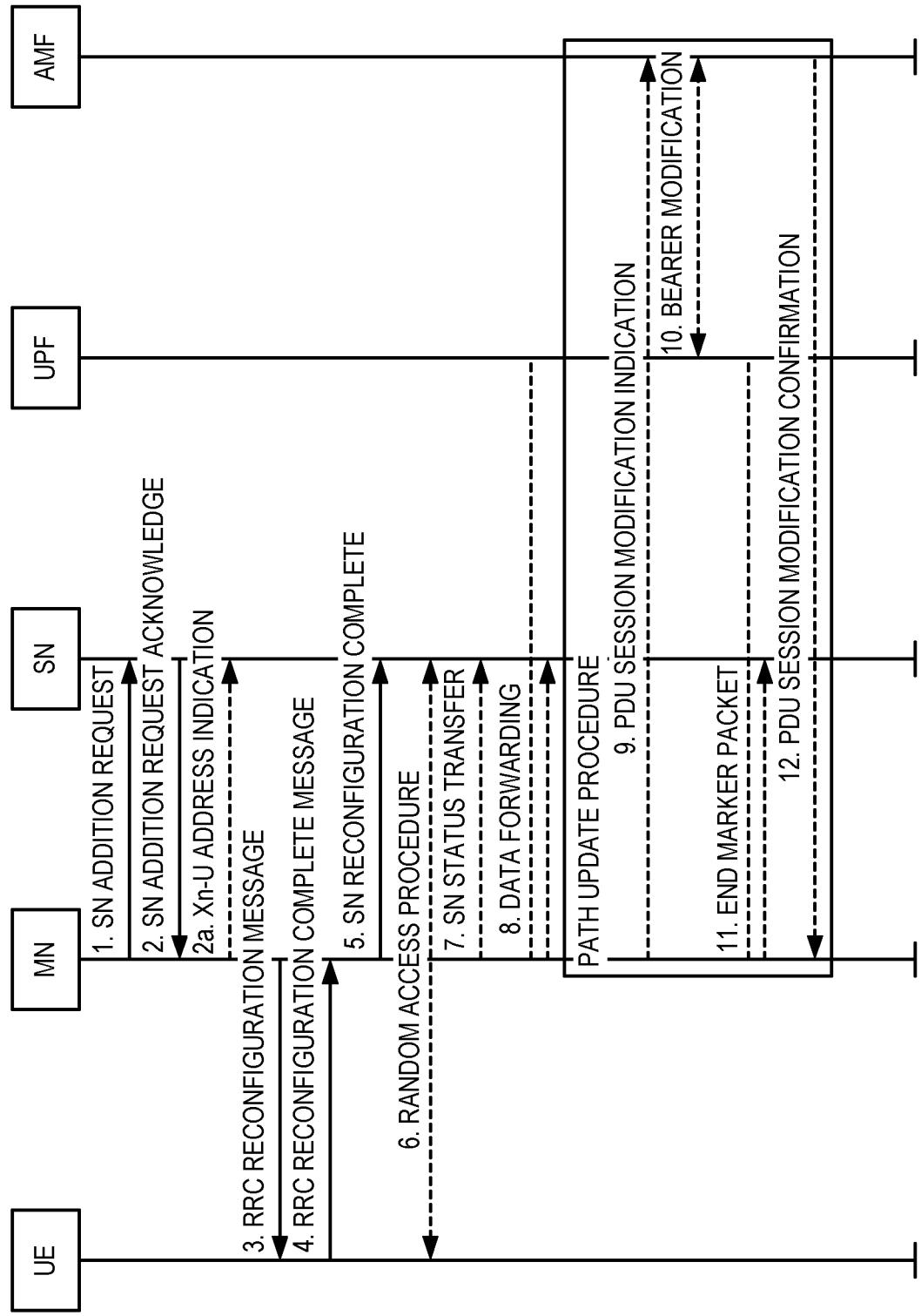
FIG. 5 is a reproduction of FIG. 10.2.2-1 from Third Generation Partnership Project (3GPP) Technical Specification (TS) 37.340 V15.6.0, which shows the Secondary Node (SN) addition procedure.
Figure 6:
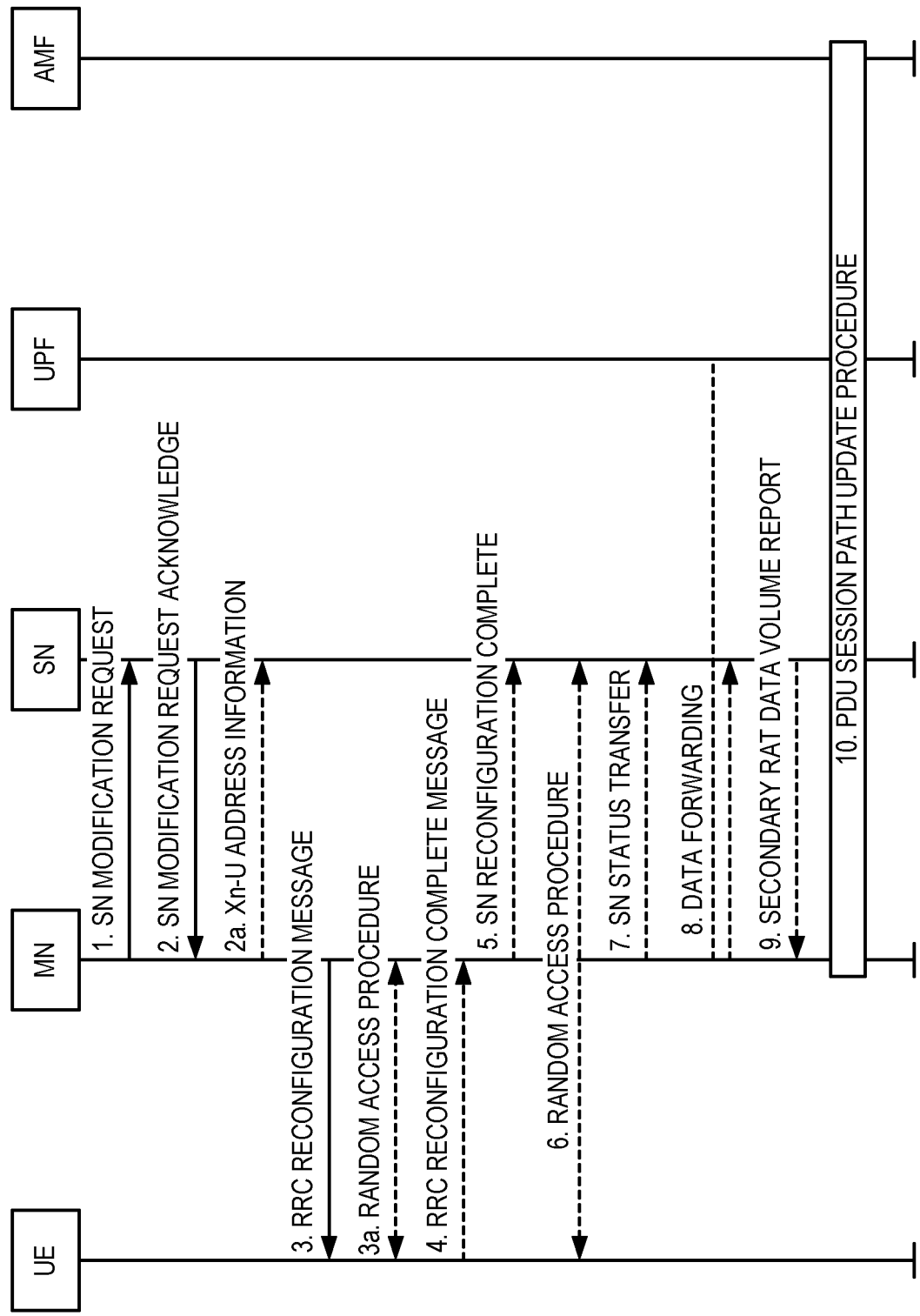
FIG. 6 is a reproduction of FIG. 10.3.2-1 from 3GPP TS 37.340 V15.6.0, which shows an example signaling flow for a Master Node (MN) initiated SN modification procedure.
Figure 7:
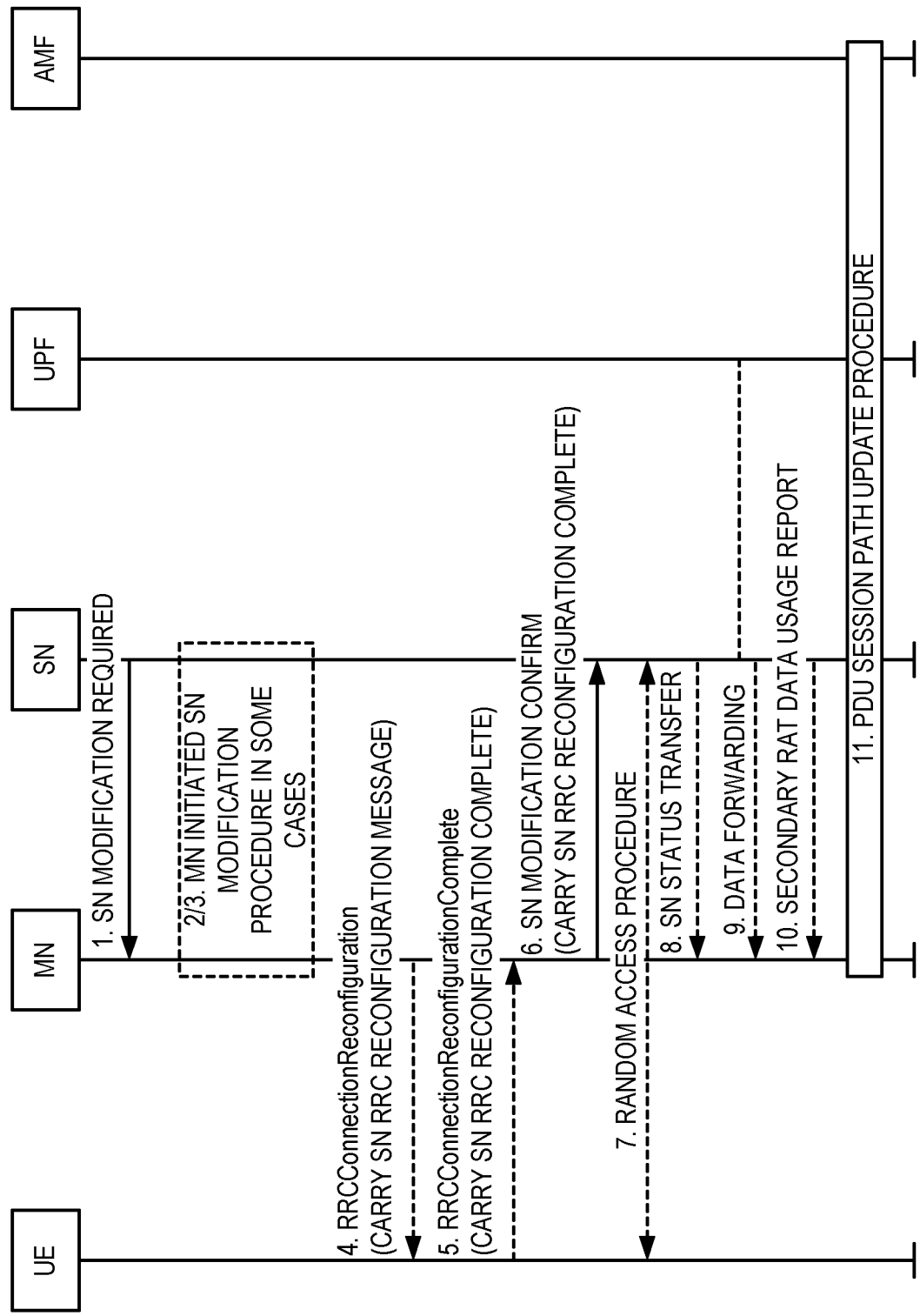
FIG. 7 is a reproduction of FIG. 10.3.2-2 from 3GPP TS 37.340 V15.6.0, which shows an example signaling flow for an SN-initiated SN modification procedure.
Figure 10:
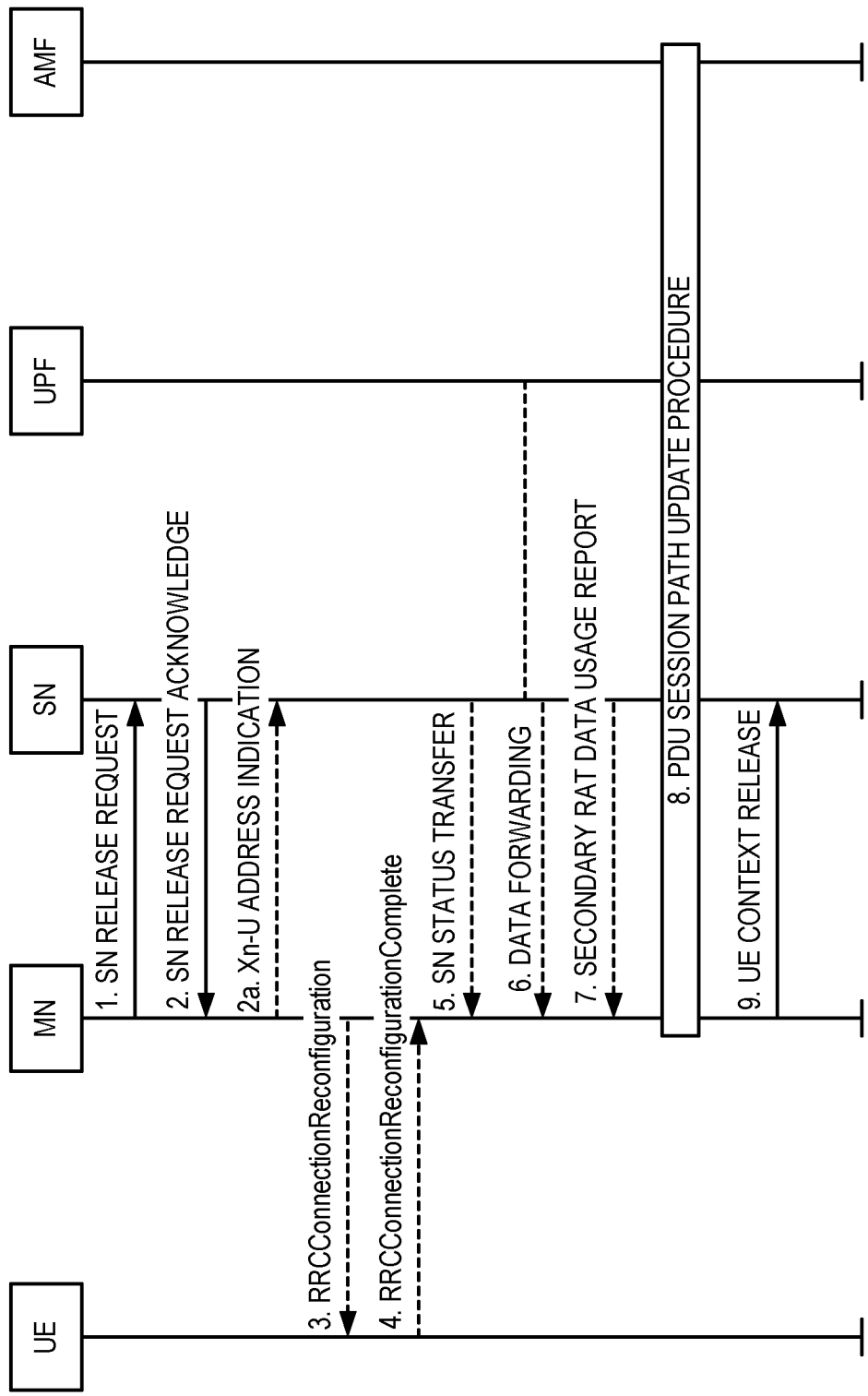
FIG. 10 is a reproduction of FIG. 10.4.2-1 from 3GPP TS 37.340 V15.6.0, which shows an example signaling flow for the MN-initiated SN release procedure.
Figure 11:
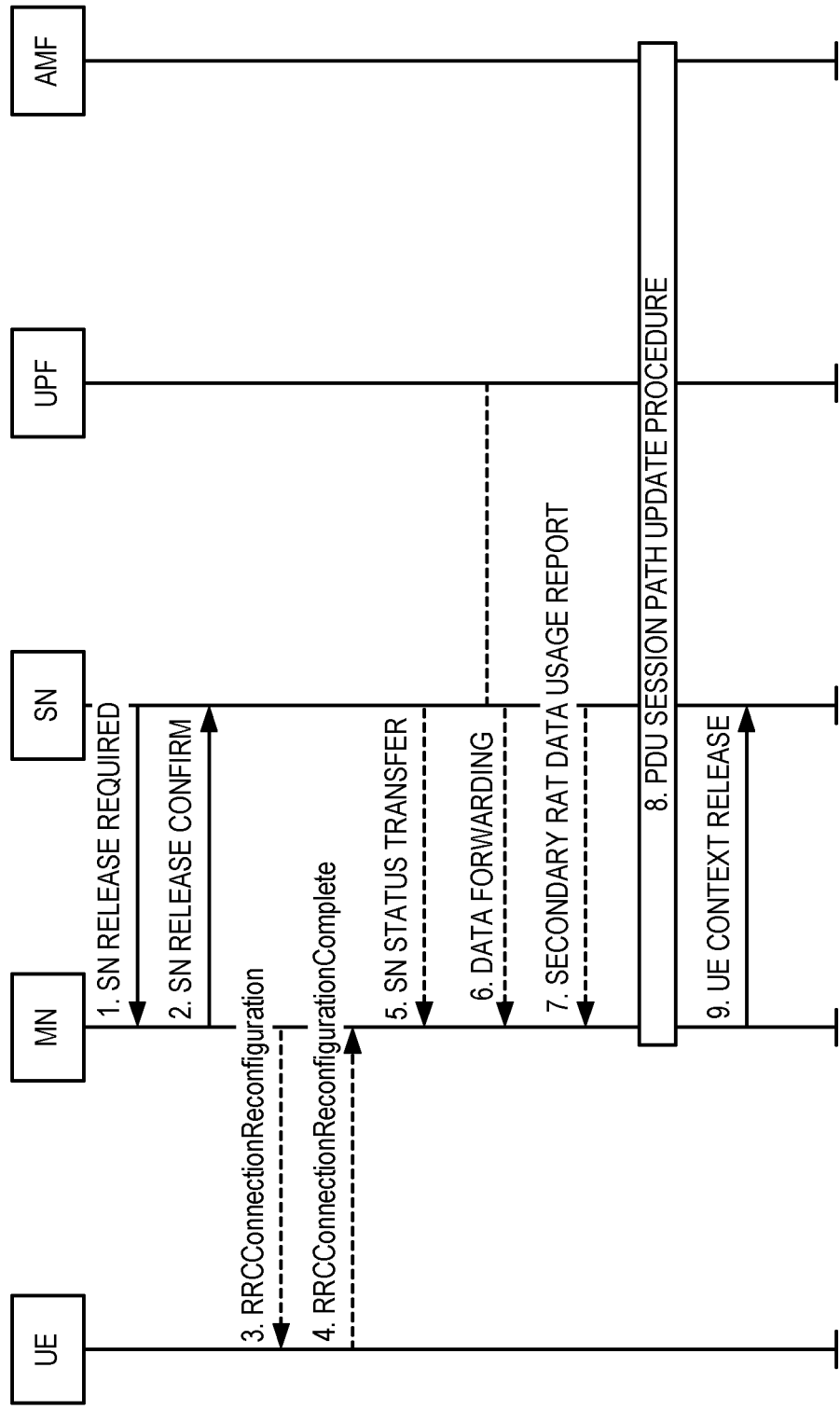
FIG. 11 is a reproduction of FIG. 10.4.2-2 from 3GPP TS 37.340 V15.6.0, which shows an example signaling flow for the SN-initiated SN release procedure.
Figure 12:
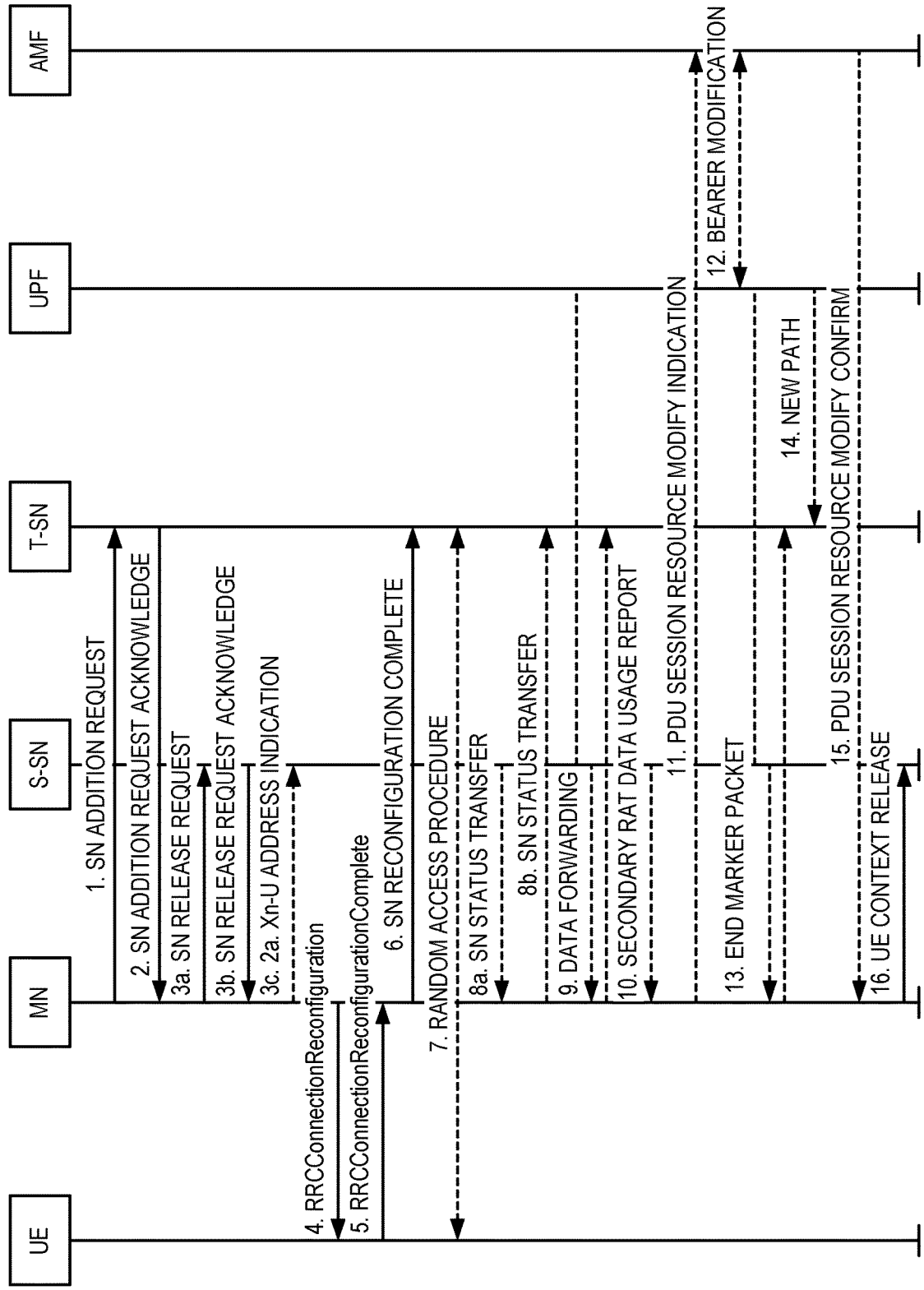
FIG. 12 is a reproduction of FIG. 10.5.2-1 from 3GPP TS 37.340 V15.6.0, which shows an example signaling flow for the SN change initiated by the MN.
Figure 13:
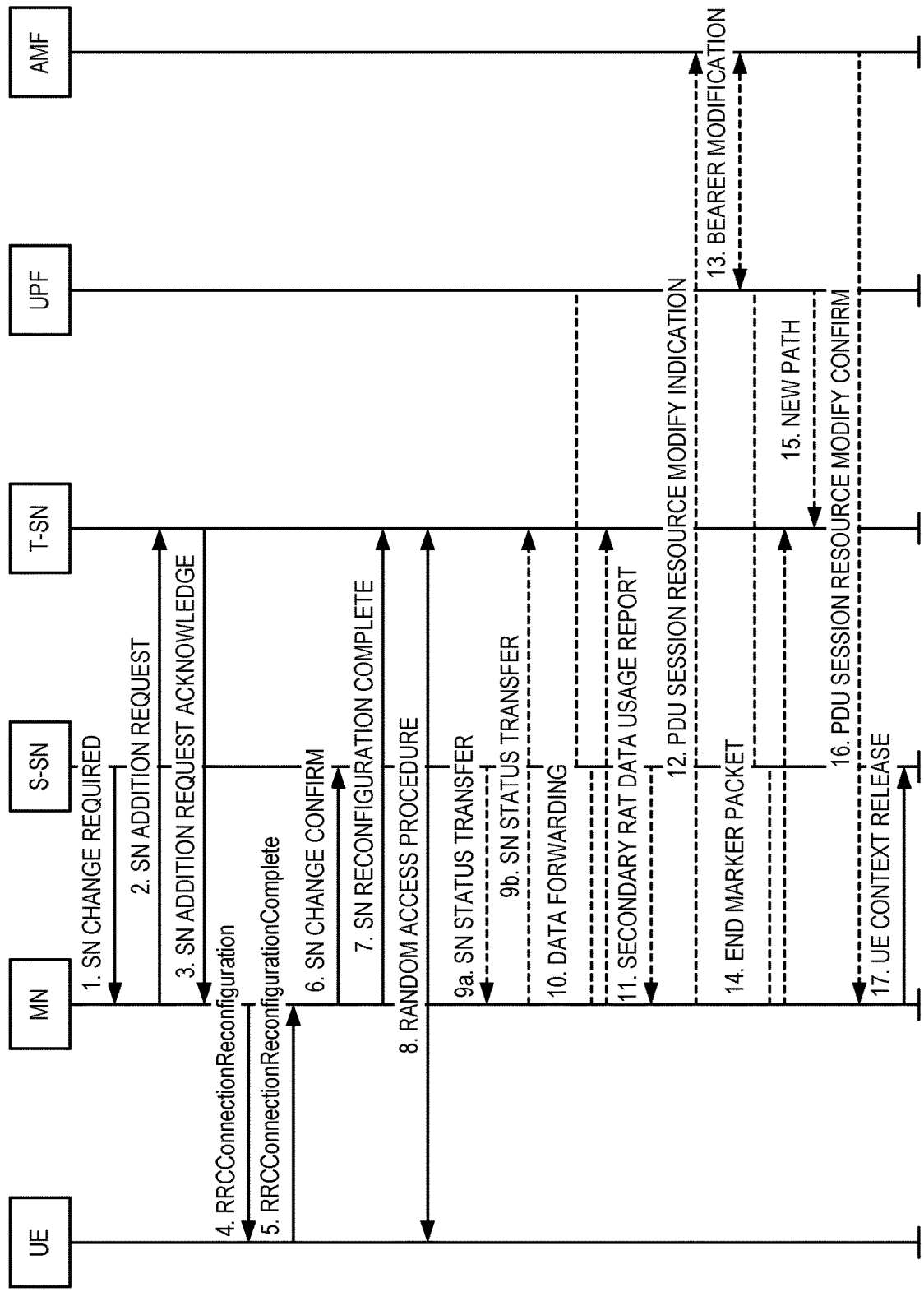
FIG. 13 is a reproduction of FIG. 10.5.2-2 from 3GPP TS 37.340 V15.6.0, which shows an example signaling flow for the SN change initiated by the SN.
Figure 14:
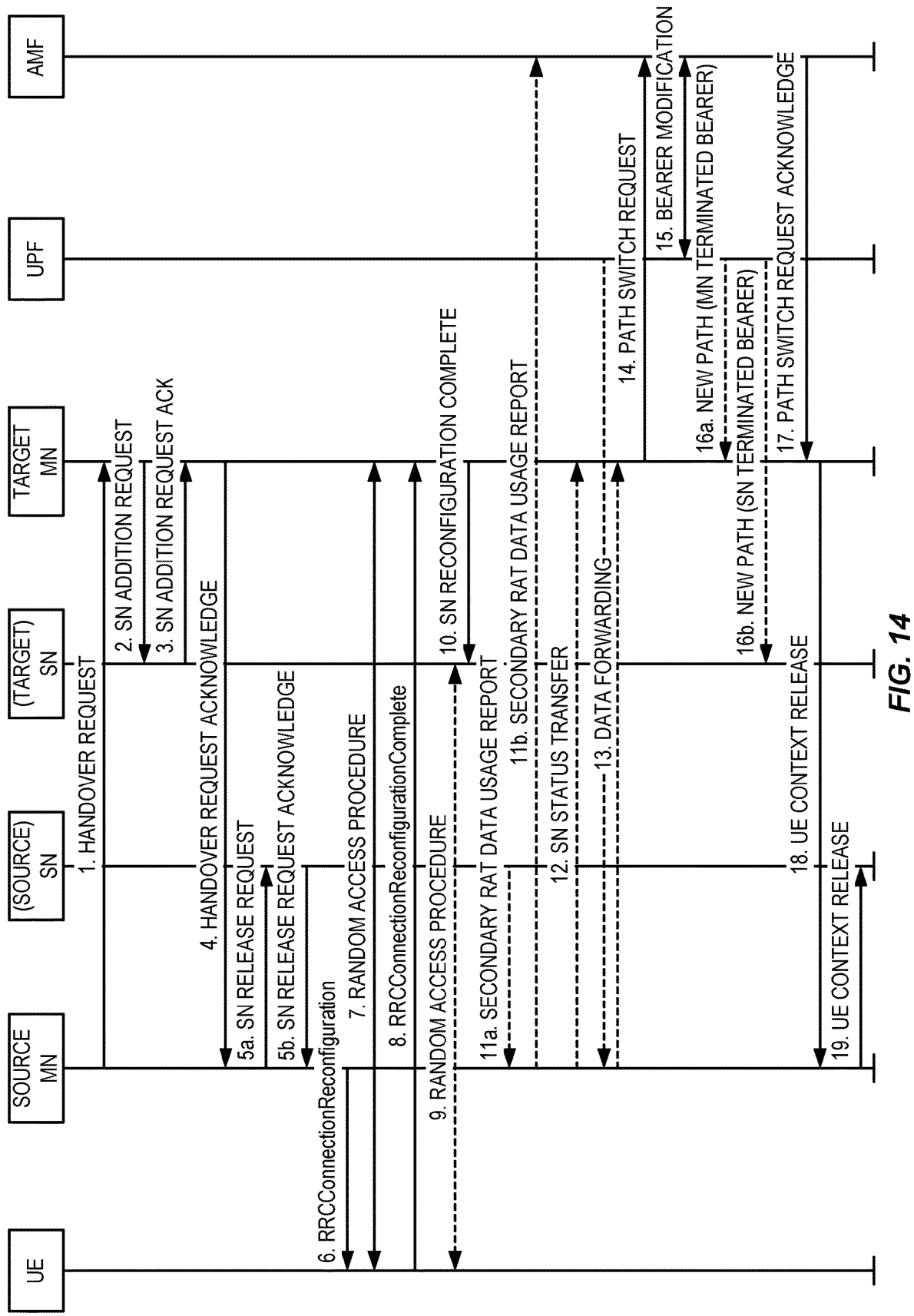
FIG. 14 is a reproduction of FIG. 10.7.2-1 from 3GPP TS 37.340 V15.6.0, which shows an example signaling flow for inter-MN handover with or without an MN-initiated SN change.
Figure 15:
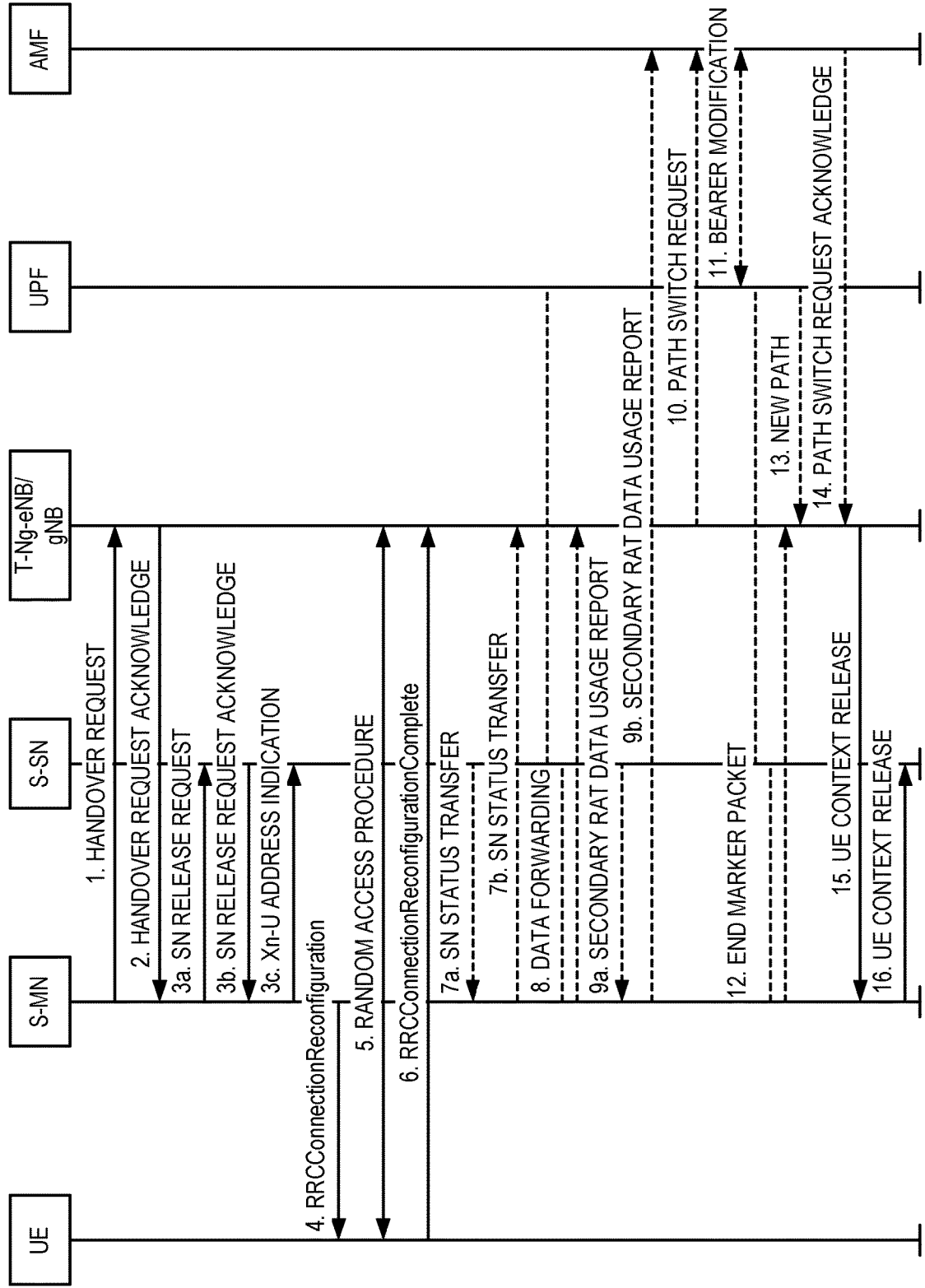
FIG. 15 is a reproduction of FIG. 10.8.2-1 from 3GPP TS 37.340 V15.6.0, which shows an example signaling flow for the MN to the Next Generation enhanced or evolved Node B (eNB) (NG-eNB)/NR base station (gNB) change procedure.
Figure 16:
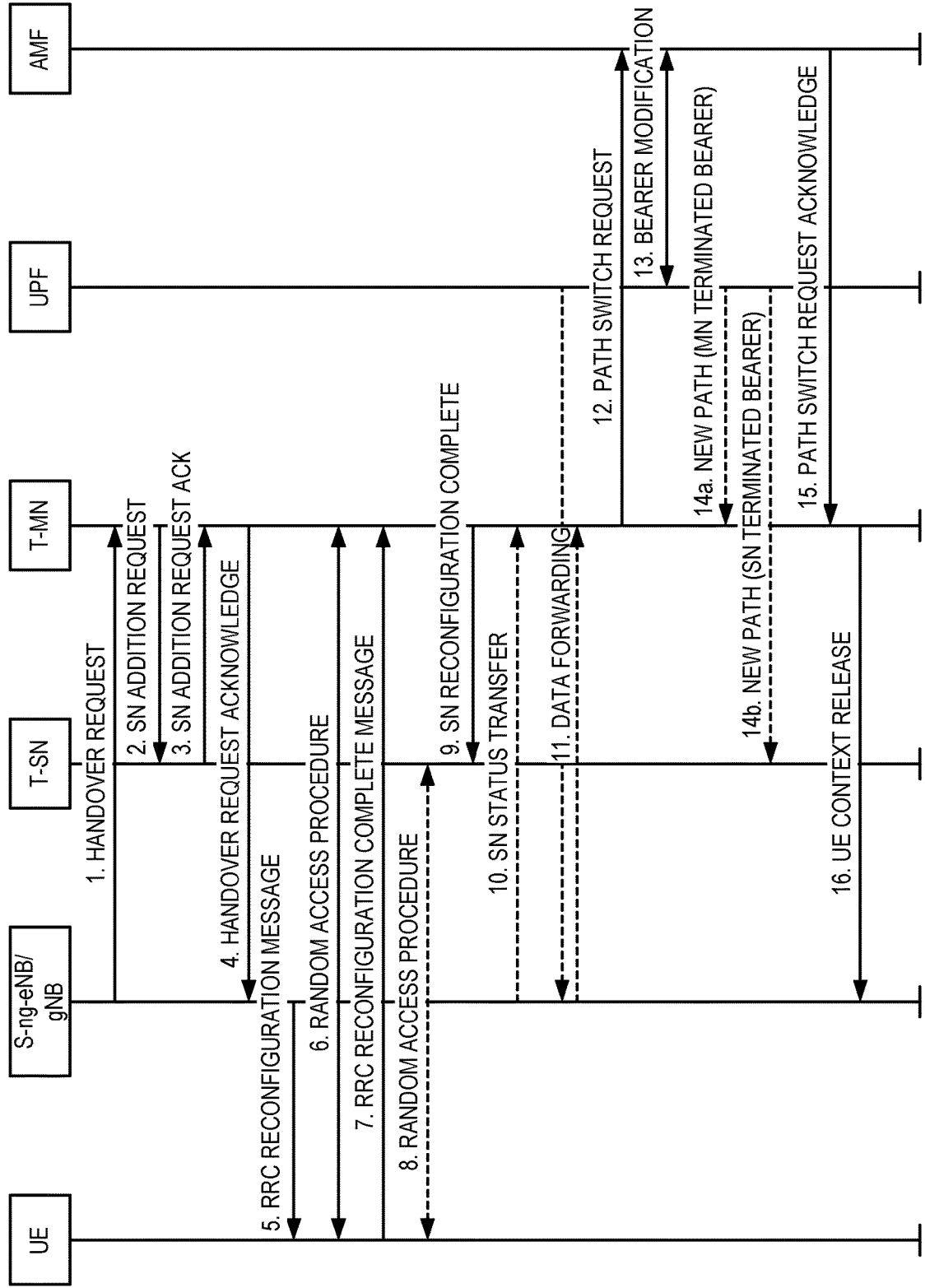
FIG. 16 is a reproduction of FIG. 10.9.2-1 from 3GPP TS 37.340 V15.6.0, which shows an example signaling flow for an NG-eNB/gNB to MN change.
Figure 17:
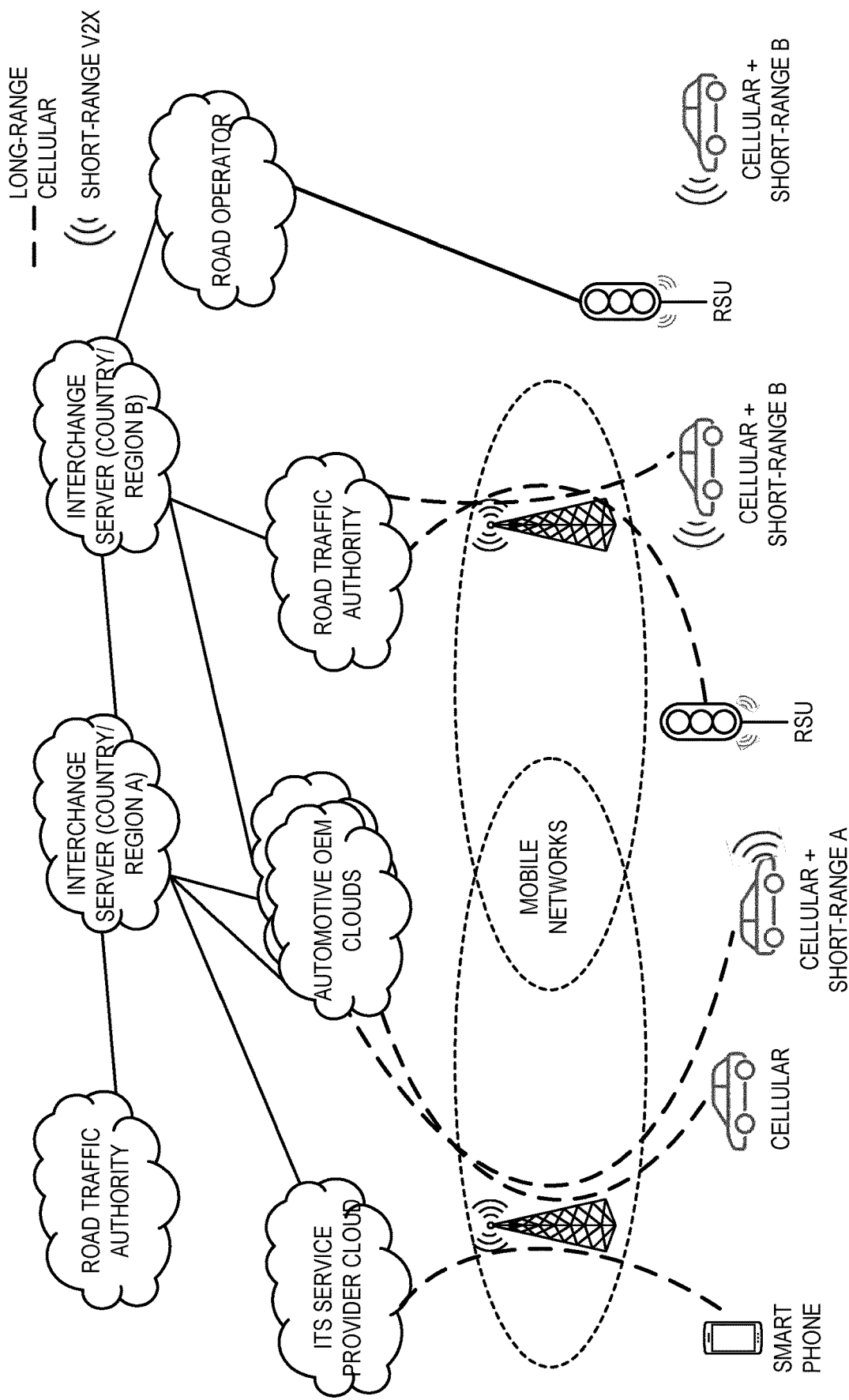
FIG. 17 illustrates a Cellular Intelligent Transport Systems (C-ITS) environment.
Figure 18:
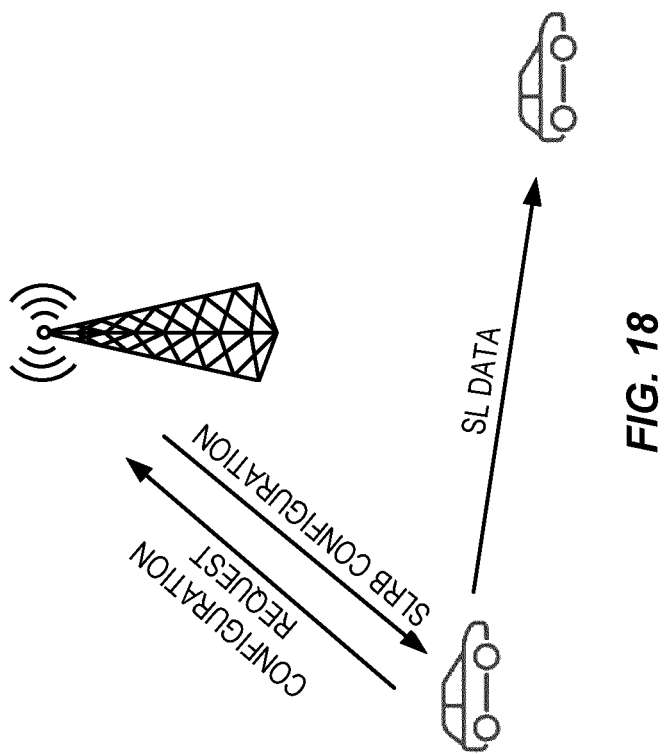
FIG. 18 illustrates an NR Sidelink (SL) Radio Bearer (SLRB) configuration provided by the network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN) or any node that implements a CN function. Some examples of a CN node include, e.g., a Mobility Management Entity (MME), a Packet Data Network Gateway (P-GW), a Service Capability Exposure Function (SCEF), a Home Subscriber Server (HSS), or the like. Some other examples of a CN node include a node implementing an Access and Mobility Function (AMF), a User Plane (UP) Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Sidelink Wireless Device: As used herein, a "sidelink wireless device," "sidelink capable wireless device," "sidelink UE," or "sidelink capable UE" is a wireless device or UE capable of Sidelink (SL) communication.

Network Node: As used herein, a "network node" is any node that is either part of the RAN or the CN of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In MR-DC, NR SL transmissions may be handled by the MN or the SN. However, currently it is not clear how the SLRB configuration and the mapping between SL QoS flow to SLRB are exchanged between the MN and the SN. According to the current specification, only the MN can configure SL transmissions. However, in normal MR-DC operations it may happen that the MN is changed (by keeping the SN) or that the SN becomes the new MN. In such cases, there is no signaling specified for coordination between the MN and the SN about the SL UE context. Furthermore, if, for example, there is no support for mode 2 SL scheduling in another RAT of MR-DC (e.g., Options 3, 4, and 7 of FIG. 1) where each node performs SL scheduling within its own RAT, there may be a need to support this by MR-DC solutions, where the MN and the SN can communicate their UE SL configurations to each other. If these problems are not solved, an SL connectivity interruption is going to happen since the SL configuration that the two (or more) UEs are using may not be valid at the MN or the SN.

In this regard, systems and methods are disclosed herein for exchanging SL UE context and configurations between a Master Node (MN) and a Secondary Node (SN), e.g., in normal Multi-Radio Dual Connectivity (DC) (MR-DC) connectivity operations. In some embodiments, the SL UE context and configuration are exchanged between the MN and the SN via inter-node Radio Resource Control (RRC)

messages. In this way, the two network nodes (the MN and the SN) are aware of the SL transmission going on under their coverage and can take the necessary actions to guarantee a stable and reliable SL connectivity.

Embodiments of the present disclosure may provide the following benefits:
- SL service continuity may be guaranteed during MR-DC operations such as SN change, SN modification, SN addition, inter-MN handover, NR base station (gNB) to enhanced or evolved Node B (eNB) handover and most of the procedure described in section 10 of the Third Generation Partnership Project (3GPP) Technical Specification (TS) 37.340 V15.6.0 specification.
- Signaling overhead between the UE and the network may be reduced since SL UE context and configuration are already exchanged between the MN and the SN.
- Resource allocation for SL between the MN and the SN may be improved since the two network nodes are aware of the SL operation ongoing under their coverage.

Figure 19:
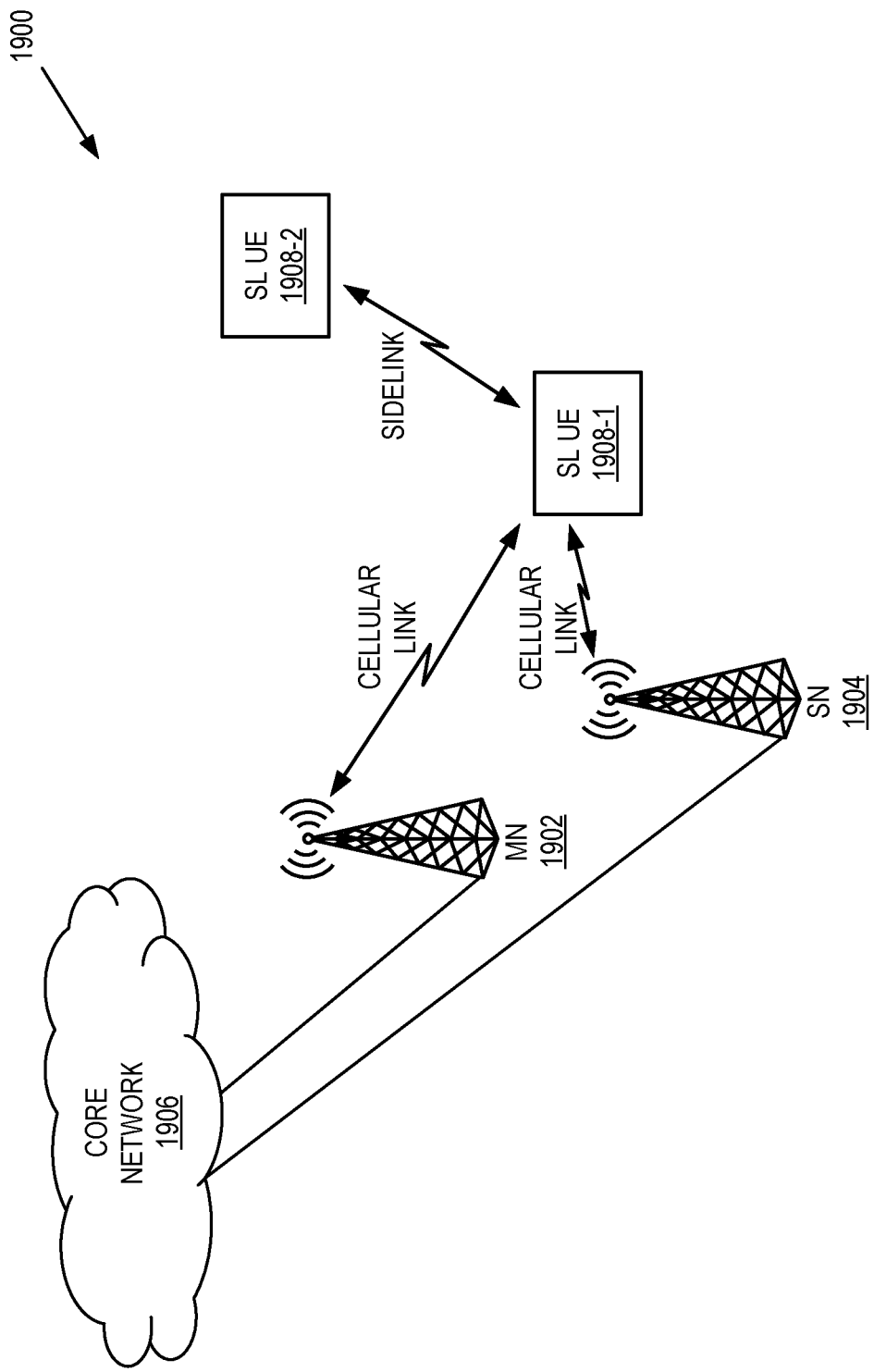
FIG. 19 illustrates one example of a cellular communications network according to some embodiments of the present disclosure.

In this regard, FIG. 19 illustrates one example of a cellular communications system 1900 in which embodiments of the present disclosure may be implemented. In the embodiments described herein, the cellular communications system 1900 is a 5G System (5GS) including an NR RAN. However, the present disclosure is not limited thereto. Rather, embodiments of the present disclosure may be implemented in other types of wireless communications systems that enable SL communications. In this example, the RAN includes base stations 1902 and 1904. In 5G NR, a base station is referred to as a gNB or a Next Generation RAN (NG-RAN) node. In LTE, a base station is referred to as an eNB. The cellular communications system 1900 also includes a core network 1906, which depending on the particular embodiment is either a 5G CN (5GCN) or an Evolved Packet Core (EPC). The base stations 1902 and 1904 are connected to the core network 1906.

The cellular communications system 1900 also includes SL wireless devices 1908-1 and 1908-2, which are also referred to herein as SL UEs 108-1 and 108-2. In this example, the SL UE 1908-1 is operating in an MR-DC mode, where the base station 1902 is configured as an MN of the SL UE 1908-1 and thus is referred to herein as an MN 1902, and the base station 1904 is configured as an SN of the SL UE 1908-1 and thus is referred to herein as an SN 1904. In some embodiments, the MN 1902 is an eNB and the SN 1904 is a gNB. In some other embodiments, the MN 1902 is a gNB and the SN 1904 is an eNB.

Now, a description of some example embodiments is provided. The methods and solutions disclosed in the following apply to NR or LTE SL operations when DC is enabled (i.e., MR-DC scenarios). According to this, the MR-DC procedures that impact the embodiments disclosed herein are, e.g., the procedure described above with respect to FIGS. 5 through 16 or described in Section 10 (Multi connectivity operation related aspect) of 3GPP Technical Specification (TS) 37.340 V15.6.0.

Note that, in some examples, the SL UE 1908-1 may not be capable of SL operations over the MN 1902 and thus the SN 1904 handles SL operations.

Embodiments of the present disclosure target a scenario where NR or LTE SL operations are performed in MR-DC scenarios where there is the presence of a primary node (e.g., MN 1902) and a secondary node (e.g., SN 1904). In such a case, the SL UE 1908-1 may be capable of SL operations only over the MN 1902, both the MN 1902 and the SN 1904, or only over the SN 1904. For this latter case, the following scenarios can be considered (but are not limited to):

Scenario #1: LTE SL UE connected to NR MN and LTE SN
In this case the LTE SN may propose to the NR MN some resource allocation for LTE SL.
Note that the LTE SL UE will not get SL Radio Bearer (SLRB) configuration from the network.

Scenario #2: NR SL UE connected to LTE MN and NR SN
In this case the NR SN may propose to the LTE MN some SLRB configuration and resource allocation for NR SL.

Scenario #3: NR SL UE connected to NR MN and NR SN
In this case the NR SN may propose to the NR MN some SLRB configuration and resource allocation for NR SL.

Note that the following embodiments are described for NR, but they may be applied to LTE or any other Radio Access Technology (RAT). Further, the NG-RAN nodes may be connected to the 5GCN or to the EPC.

Systems and methods are disclosed herein for exchanging SL UE context and configurations between the MN 1902 and the SN 1904 in normal MR-DC connectivity operations. In some embodiments, the SL UE context and configuration are exchanged between the MN 1902 and the SN 1904 via inter-node RRC messages. In this way, the two network nodes (the MN 1902 and the SN 1904) are aware of the SL transmission going on under their coverage and can take the necessary actions to guarantee a stable and reliable SL connectivity.

Figure 20:
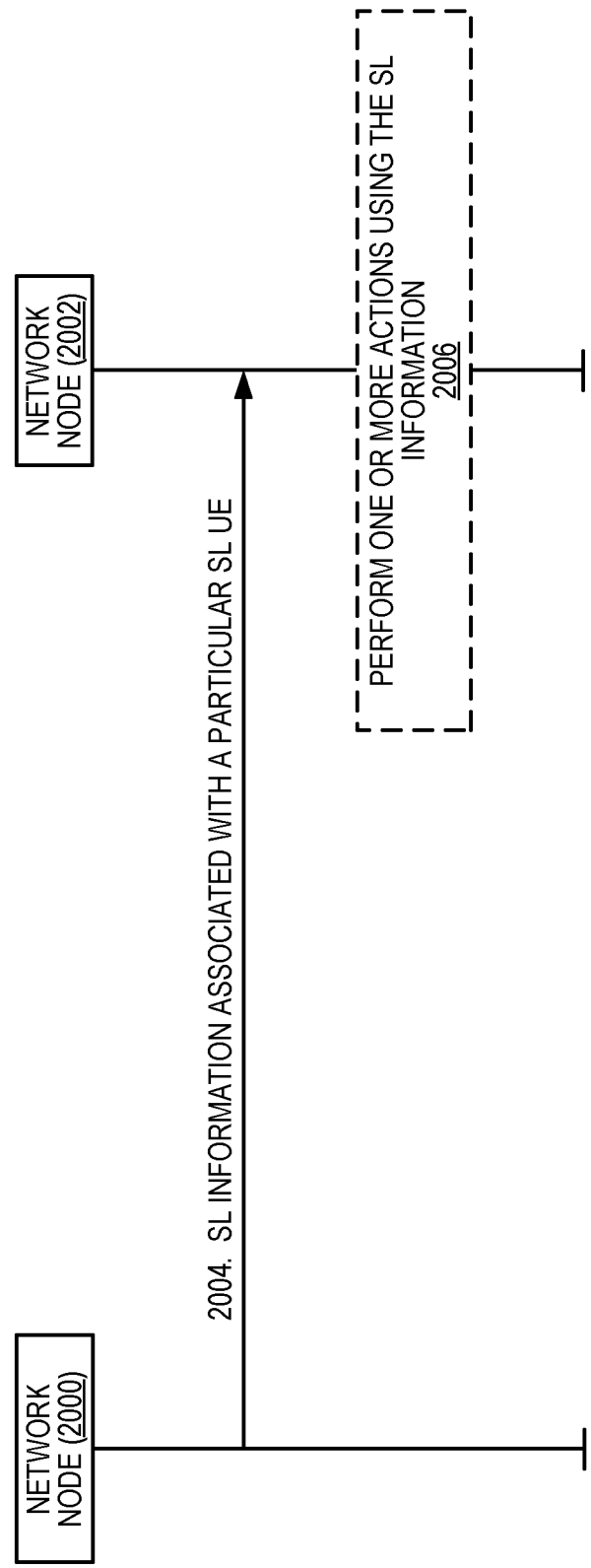
FIG. 20 illustrates the operation of two network nodes to exchange SL related information in accordance with some embodiments of the present disclosure.

FIG. 20 illustrates the operation of two network nodes 2000 and 2002 in accordance with some embodiments of the present disclosure. In some embodiments, the network node 2000 is the MN 1902 and the network node 2002 is the SN 1904. In some other embodiments, the network node 2000 is the SN 1904 and the network node 2002 is the MN 1902. As illustrated, the network node 2000 sends, to the network node 2002, SL information associated with the SL UE 1908-1 (step 2004). The SL information preferably includes an SL UE context of the SL UE 1908-1, SL related configuration information (e.g., SLRB configuration) of the SL UE 1908-1, or both. In some embodiments, the network node 2000 sends the SL information to the network node 2002 via one or more inter-mode messages (e.g., one or more inter-node RRC messages). This information may be sent from the network node 2000 to the network node 2002 using an existing or new message(s) during, e.g., any one of MR-DC procedures described above with respect to FIGS. 5 through 16, or described in Section 10 (Multi connectivity operation related aspect) of 3GPP TS 37.340 V15.6.0. The network node 2002 then performs one or more actions using the received SL information (step 2006). For example, the network node 2002 may prepare SL resources for DC operation of the SL UE 1908-1, etc.

In one embodiment, the SL UE context and configurations exchanged include the SL Quality of Service (QoS) flow and SLRB configuration for the SL UE 1908-1. Yet, in another embodiment, the SL UE context and configurations exchanged include the (NR)SidelinkUEInformation message. In another embodiment, the SL UE context and configurations exchanged include the UEAssistanceInformation message. Further, in one other embodiment, the SL UE context and configurations exchanged include the SL configured grant, Transmission/Reception (TX/RX) resource pools, and SL UE capabilities. Finally, in one embodiment, the SL UE context and configurations exchanged include the SL QoS flow and SLRB configurations, the (NR)SidelinkUEInformation message, the UEAssistanceInformation message, the SL configured grant, TX/RX resource pools, and SL UE capabilities.

In one embodiment, the primary node (e.g., the MN 1902) during the addition, modification, or changing of the SN, sends the SL UE context and the UE SL configurations to the SN (e.g., the SN 1904) via inter-node RRC messages (e.g., CG-ConfigInfo message). In another embodiment, the primary node sends the SL UE context and the UE SL configurations to the SN via X2/Xn signaling and messages. For instance, when the MN 1902 sends the S-NODE ADDITION REQUEST message to the SN 1904, the MN 1902 can request the preparation of SL resources for DC operation for the SL UE 1908-1, by exchanging the UE context and SL configuration present in the inter-node RRC container (e.g., CG-ConfigInfo message defined in subclause 11.2.2 of TS 38.331 V15.6.0 or the SCG-ConfigInfo message as defined in subclause 10.2.2 of TS 36.331 V15.6.0).

In an alternative embodiment, the primary node (e.g., the MN 1902) sends a message to the SN (e.g., the SN 1904) via inter-node RRC messages (i.e., in CG-ConfigInfo) by indicating that the SL UE context and the UE SL configurations are available. This message may be an inter-node message for handover preparation from a first network node to a second network node. For example, the SL UE 1908-1 may try to resume in the first network node and report the SL context and configuration there. Upon receiving this SL information, the first network node decides to trigger a handover for that UE towards a second network node and, during handover preparation, the first node forwards to the second node these SL configurations, so the second node is aware of the ongoing SL operations at the first node. For instance, when the MN 1902 sends the S-NODE MODIFICATION REQUEST message to the SN 1904, the MN 1902 can request the modification of a specific UE's SL resources configuration in the SN, by exchanging the UE context and SL configuration present in the inter-node RRC container (e.g., CG-ConfigInfo message defined in subclause 11.2.2 of TS 38.331 V15.6.0 or the SCG-ConfigInfo message as defined in subclause 10.2.2 of TS 36.331 V15.6.0).

In another embodiment, the SN receives an inter-node RRC message from the primary node that includes the SL UE context and configurations. In one embodiment, upon decoding the message, the SN replies with an inter-node RRC message (e.g., CG-Config) to the primary node by confirming that the SL session continuity can be guaranteed (e.g., enough resources are available for handling the SL transmission). In another embodiment, upon decoding the message, the SN replies with an inter-node RRC message (e.g., CG-Config) to the primary node by informing that ongoing SL session continuity cannot be handled at the SN (e.g., lack of radio resources). For instance, the SN 1904 can send the S-NODE MODIFICATION REQUEST ACKNOWLEDGE message to the MN 1902 to inform the MN 1902 via the S-NG-RAN node to M-NG-RAN node Container Information Element (IE) that its request to modify the SN SL resources for the UE 1908-1 has been guaranteed. Or the SN 1904 can reply, via the S-NODE MODIFICATION REQUEST REJECT, to the MN 1902 that its request has failed and that the UE SL continuity will not be guaranteed.

In another embodiment, the SN 1904 can take the initiative by informing the MN 1902 about the SL UE context and SL configurations in an inter-node RRC message. The MN 1902 may then confirm the SL configuration proposed by the SN 1904 and inform back the SN 1904 of the updated UE context and SL session continuity. In another embodiment, the MN 1902 may reject the proposed configuration proposed by the SN 1902 and inform the SN 1904 that the SL session continuity is not guaranteed. For instance, the SN 1904 can send the S-NODE MODIFICATION REQUIRED message to the MN 1902 to report the UE context and SL configuration contained in the S-NG-RAN node to M-NG-RAN node Container IE. Upon decoding the message, the MN 1902 can send the S-NODE MODIFICATION CONFIRM message to inform the SN 1904 about the successful modification of the UE context; or send to the SN 1904 the S-NODE MODIFICATION REFUSE to inform it that the SN's initiated node modification has failed.

In one embodiment, the SN, upon sending a confirmation (via inter-node RRC message) to the primary node by confirming that the SL session continuity can be guaranteed, sends a direct message to the SL UEs with new SL configurations to be used. In another embodiment, the SN sends the direct message to the SL UEs via SRB3. Yet, in another embodiment, the SN sends the direct message to the SL UEs via SRB1 (i.e., embedded in an MN message). In an alternative embodiment, the SN sends all the necessary SL configurations to the primary node and the primary node forwards such SL configuration to the SL UEs with a direct message via SRB1.

In another embodiment, the TX and RX SL UE transmits a message independently with its SL context and configurations to the primary node (e.g., the MN 1902). In one embodiment, the TX and RX SL UE transmits a message independently with its SL context and configurations to the SN (e.g., the SN 1904). Yet, in another embodiment, one of the two peer UEs (i.e., the SL TX or RX UE) sends the SL context and configurations to the primary node. Further, in a different embodiment, one of the two peer UEs (i.e., the SL TX or RX UE) sends the SL context and configurations to the SN.

Figure 21:
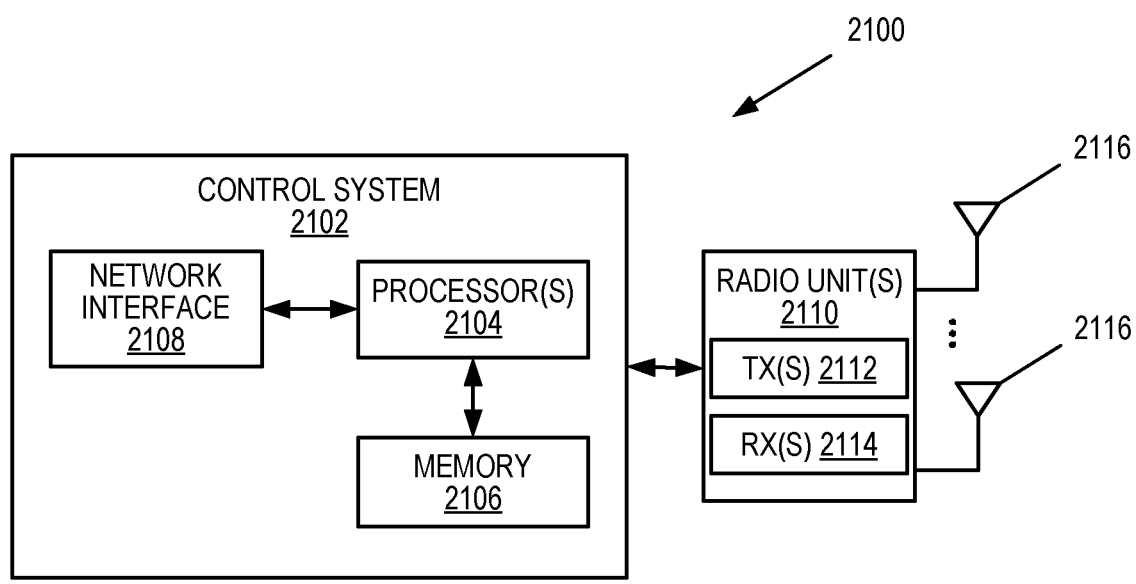
FIG. 21 is a schematic block diagram of a radio access node according to some embodiments of the present disclosure.

FIG. 21 is a schematic block diagram of a radio access node 2100 according to some embodiments of the present disclosure. The radio access node 2100 may be, for example, an MN 1902 or an SN 1904. As illustrated, the radio access node 2100 includes a control system 2102 that includes one or more processors 2104 (e.g., Central Processing Units (CPUs), Application Specific Integrated Circuits (ASICs), Field Programmable Gate Arrays (FPGAs), and/or the like), memory 2106, and a network interface 2108. The one or more processors 2104 are also referred to herein as processing circuitry. In addition, the radio access node 2100 includes one or more radio units 2110 that each includes one or more transmitters 2112 and one or more receivers 2114 coupled to one or more antennas 2116. The radio units 2110 may be referred to or be part of radio interface circuitry. In some embodiments, the radio unit(s) 2110 is external to the control system 2102 and connected to the control system 2102 via, e.g., a wired connection (e.g., an optical cable). However, in some other embodiments, the radio unit(s) 2110 and potentially the antenna(s) 2116 are integrated together with the control system 2102. The one or more processors 2104 operate to provide one or more functions of a radio access node 2100 as described herein (e.g., one or more functions of the MN 1902 or the SN 1904 as described above, e.g., with respect to FIG. 20). In some embodiments, the function(s) are implemented in software that is stored, e.g., in the memory 2106 and executed by the one or more processors 2104.

Figure 22:
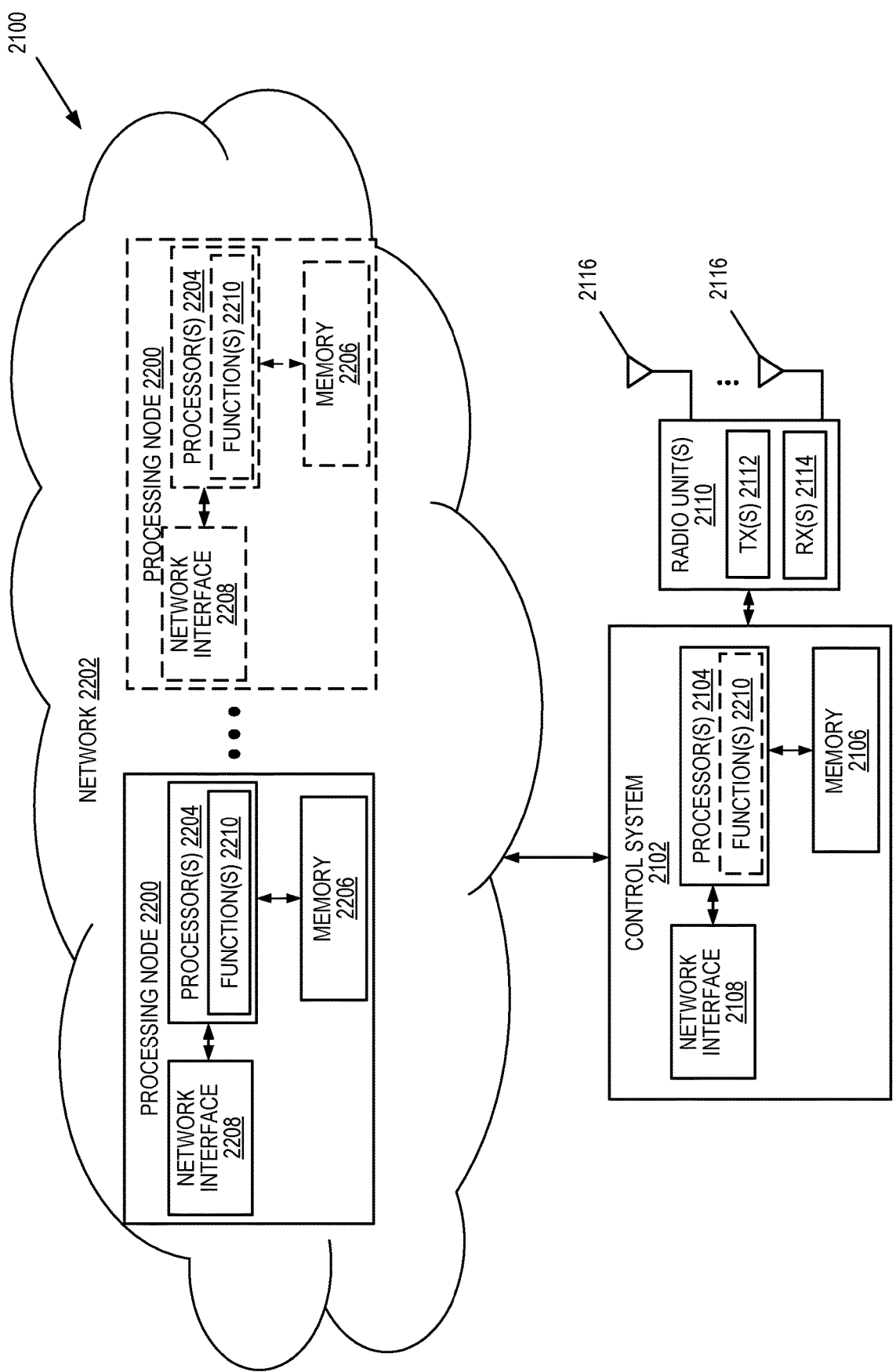
FIG. 22 is a schematic block diagram that illustrates a virtualized embodiment of the radio access node of FIG. 21 according to some embodiments of the present disclosure.

FIG. 22 is a schematic block diagram that illustrates a virtualized embodiment of the radio access node 2100 according to some embodiments of the present disclosure.

This discussion is equally applicable to other types of network nodes. Further, other types of network nodes may have similar virtualized architectures.

As used herein, a "virtualized" radio access node is an implementation of the radio access node 2100 in which at least a portion of the functionality of the radio access node 2100 is implemented as a virtual component(s) (e.g., via a virtual machine(s) executing on a physical processing node(s) in a network(s)). As illustrated, in this example, the radio access node 2100 includes the control system 2102 that includes the one or more processors 2104 (e.g., CPUs, ASICs, FPGAs, and/or the like), the memory 2106, the network interface 2108, and the one or more radio units 2110 that each includes the one or more transmitters 2112 and the one or more receivers 2114 coupled to the one or more antennas 2116, as described above. The control system 2102 is connected to the radio unit(s) 2110 via, for example, an optical cable or the like. The control system 2102 is connected to one or more processing nodes 2200 coupled to or included as part of a network(s) 2202 via the network interface 2108. Each processing node 2200 includes one or more processors 2204 (e.g., CPUs, ASICs, FPGAs, and/or the like), memory 2206, and a network interface 2208.

In this example, functions 2210 of the radio access node 2100 described herein (e.g., one or more functions of the MN 1902 or the SN 1904 as described above, e.g., with respect to FIG. 20) are implemented at the one or more processing nodes 2200 or distributed across the control system 2102 and the one or more processing nodes 2200 in any desired manner. In some particular embodiments, some or all of the functions 2210 of the radio access node 2100 described herein are implemented as virtual components executed by one or more virtual machines implemented in a virtual environment(s) hosted by the processing node(s) 2200. As will be appreciated by one of ordinary skill in the art, additional signaling or communication between the processing node(s) 2200 and the control system 2102 is used to carry out at least some of the desired functions 2210. Notably, in some embodiments, the control system 2102 may not be included, in which case the radio unit(s) 2110 communicate directly with the processing node(s) 2200 via an appropriate network interface(s).

In some embodiments, a computer program including instructions which, when executed by at least one processor, causes the at least one processor to carry out the functionality of the radio access node 2100 or a node (e.g., a processing node 2200) implementing one or more of the functions 2210 of the radio access node 2100 (e.g., one or more functions of the MN 1902 or the SN 1904 as described above, e.g., with respect to FIG. 20) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
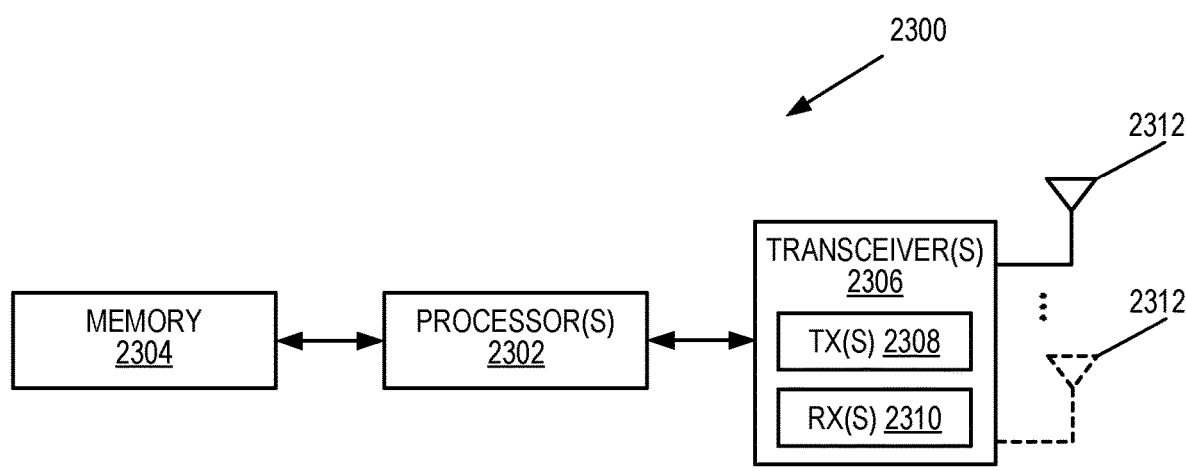
FIG. 23 is a schematic block diagram of a UE according to some embodiments of the present disclosure.

FIG. 23 is a schematic block diagram of a UE 2300 according to some embodiments of the present disclosure. As illustrated, the UE 2300 includes one or more processors 2302 (e.g., CPUs, ASICs, FPGAs, and/or the like), memory 2304, and one or more transceivers 2306 each including one or more transmitters 2308 and one or more receivers 2310 coupled to one or more antennas 2312. The transceiver(s) 2306 includes radio-front end circuitry connected to the antenna(s) 2312 that is configured to condition signals communicated between the antenna(s) 2312 and the processor(s) 2302, as will be appreciated by one of ordinary skill in the art. The processors 2302 are also referred to herein as processing circuitry. The transceivers 2306 are also referred to herein as radio circuitry. In some embodiments, the functionality of the UE 2300 described above may be fully or partially implemented in software that is, e.g., stored in the memory 2304 and executed by the processor(s) 2302. Note that the UE 2300 may include additional components not illustrated in FIG. 23 such as, e.g., one or more user interface components (e.g., an input/output interface including a display, buttons, a touch screen, a microphone, a speaker(s), and/or the like and/or any other components for allowing input of information into the UE 2300 and/or allowing output of information from the UE 2300), a power supply (e.g., a battery and associated power circuitry), etc.

In some embodiments, a computer program including instructions which, when executed by at least one processor, causes the at least one processor to carry out the functionality of the UE 2300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.). While not being limited thereto, some example embodiments of the present disclosure are provided below.

Embodiment 1: A method performed by a first network node, comprising sending, to a second network node, Sidelink, SL, information associated with a particular SL User Equipment, UE.

Embodiment 2: The method of embodiment 1, wherein:
the first network node comprises a base station that operates in accordance with a first radio access technology;
the second network node comprises a base station that operates in accordance with a second radio access technology; and
the SL UE operates in a dual connectivity mode in which one of the first network node and the second network node comprises a master node of the SL UE and the other one of the first network node and the second network node comprises a secondary node of the SL UE.

Embodiment 3: The method of embodiment 2, wherein:
the first network node comprises an enhanced or evolved Node B, eNB; and
the second network node comprises a New Radio, NR, base station, gNB.

Embodiment 4: The method of embodiment 2, wherein:
the first network node comprises a New Radio, NR, base station, gNB; and
the second network node comprises an enhanced or evolved Node B, eNB.

Embodiment 5: The method of any one of embodiments 1 to 4, wherein the SL information associated with the particular SL UE comprises:
SL UE context information of the particular SL UE;
one or more SL configurations of the particular SL UE; or
both the SL UE context information of the particular SL UE and the one or more SL configurations of the particular SL UE.

Embodiment 6: The method of any one of embodiments 1 to 5, further comprising obtaining information that indicates what SL related information is to be included in the SL information sent to the second network node.

Embodiment 7: The method of embodiment 6, wherein the information that indicates what SL related information is to be included in the SL information sent to the second network node is included in:
SL Quality of Service, QoS, flow and SL Radio Bearer, SLRB, configuration information for the particular SL UE;
a SidelinkUEInformation message for the particular SL UE;
a UEAssistanceInformation message for the particular SL UE;
an SL configured grant for the particular SL UE;
information regarding Transmission/Reception, TX/RX, resource pools for the particular SL UE; or
SL UE capabilities of the particular SL UE.

Embodiment 8: The method of any one of embodiments 1 to 7, wherein sending the SL information comprises sending the SL information to the second network node during a Secondary Node, SN, addition procedure, during an SN modification procedure, or during an SN change procedure.

Embodiment 9: The method of any one of embodiments 1 to 8, wherein sending the SL information comprises sending the SL information via one or more inter-node messages.

Embodiment 10: The method of embodiment 9, wherein the one or more inter-node messages comprise one or more Radio Resource Control, RRC, messages.

Embodiment 11: A first network node for a cellular communications system, the first network node adapted to send, to a second network node, Sidelink, SL, information associated with a particular SL User Equipment, UE.

Embodiment 12: The first network node of embodiment 11, further adapted to perform the method of any one of embodiments 2 to 10.

Embodiment 13: A first network node for a cellular communications system, the first network node comprising:
a network interface; and
processing circuitry associated with the network interface, the processing circuitry configured to cause the first network node to send, to a second network node, Sidelink, SL, information associated with a particular SL User Equipment, UE.

Embodiment 14: The first network node of embodiment 13, wherein the processing circuitry is further configured to cause the first network node to perform the method of any one of embodiments 2 to 10.

Embodiment 15: A method performed by a second network node, comprising receiving, from a first network node, Sidelink, SL, information associated with a particular SL User Equipment, UE.

Embodiment 16: The method of embodiment 15, wherein:
the first network node comprises a base station that operates in accordance with a first radio access technology; the second network node comprises a base station that operates in accordance with a second radio access technology; and
the SL UE operates in a dual connectivity mode in which one of the first network node and the second network node comprises a master node of the SL UE and the other one of the first network node and the second network node comprises a secondary node of the SL UE.

Embodiment 17: The method of embodiment 16, wherein:
the first network node comprises an enhanced or evolved Node B, eNB; and
the second network node comprises a New Radio, NR, base station, gNB.

Embodiment 18: The method of embodiment 16, wherein:
the first network node comprises a New Radio, NR, base station, gNB; and
the second network node comprises an enhanced or evolved Node B, eNB.

Embodiment 19: The method of any one of embodiments 15 to 18, wherein the SL information associated with the particular SL UE comprises:
SL UE context information of the particular SL UE;
one or more SL configurations of the particular SL UE; or
both the SL UE context information of the particular SL UE and the one or more SL configurations of the particular SL UE.

Embodiment 20: The method of any one of embodiments 15 to 19, wherein receiving the SL information comprises receiving the SL information from the first network node during a Secondary Node, SN, addition procedure, during an SN modification procedure, or during an SN change procedure.

Embodiment 21: The method of any one of embodiments 15 to 20, wherein receiving the SL information comprises receiving the SL information via one or more inter-node messages.

Embodiment 22: The method of embodiment 21, wherein the one or more inter-node messages comprise one or more Radio Resource Control, RRC, messages.

Embodiment 23: The method of any one of embodiments 15 to 22, further comprising performing one or more actions based on the SL information.

Embodiment 24: A second network node for a cellular communications system, the second network node adapted to receive, from a first network node, Sidelink, SL, information associated with a particular SL User Equipment, UE.

Embodiment 25: The second network node of embodiment 24, further adapted to perform the method of any one of embodiments 16 to 23.

Embodiment 26: A second network node for a cellular communications system, the second network node comprising:

a network interface; and processing circuitry associated with the network interface, the processing circuitry configured to cause the second network node to receive, from a first network node, Sidelink, SL, information associated with a particular SL User Equipment, UE.

Embodiment 27: The second network node of embodiment 26, wherein the processing circuitry is further configured to cause the second network node to perform the method of any one of embodiments 16 to 23.

At least some of the following abbreviations may be used in this disclosure:

3GPP Third Generation Partnership Project
5G Fifth Generation
5GCN Fifth Generation Core Network
5GS Fifth Generation System
AM Acknowledged Mode
AMF Access and Mobility Function
AS Access Stratum
AUSF Authentication Server Function
BSR Buffer Status Report
CA Carrier Aggregation
C-ITS Cellular Intelligent Transport Systems
CN Core Network
CP Control Plane
D2D Device-to-Device
DC Dual Connectivity
DCI Downlink Control Information
DRB Data Radio Bearer
eLTE Enhanced Long Term Evolution
eNB Enhanced or Evolved Node B
EN-DC Evolved Universal Terrestrial Radio Access New Radio Dual Connectivity
EPC Evolved Packet Core
E-UTRA Evolved Universal Terrestrial Radio Access
eV2X Enhanced Vehicle-to-Everything
gNB New Radio Base Station
HSS Home Subscriber Server
IE Information Element
ITS Intelligent Transport Systems
LTE Long Term Evolution
MAC Medium Access Control
MC Multi-Connectivity
MCG Master Cell Group
MeNB Master Enhanced or Evolved Node B
MgNB Master New Radio Base Station
MME Mobility Management Entity
MN Master Node
MR-DC Multi-Radio Dual Connectivity
MTC Machine Type Communication
NAS Non-Access Stratum
NE-DC New Radio Evolved Universal Terrestrial Radio Access Dual Connectivity
NEF Network Exposure Function
NF Network Function
NG-eNB Next Generation Enhanced or Evolved Node B
NGEN-DC Next Generation Radio Access Network Evolved Universal Terrestrial Radio Access New Radio Dual Connectivity
NG-RAN Next Generation Radio Access Network
NR New Radio
NRF Network Function Repository Function
NSSF Network Slice Selection Function
OEM Original Equipment Manufacturer
PCF Policy Control Function
PCT Patent Cooperation Treaty
PDCCH Physical Downlink Control Channel
PDCP Packet Data Convergence Protocol
PDU Protocol Data Unit
P-GW Packet Data Network Gateway
PSCCH Physical Sidelink Control Channel
PSCell Primary Secondary Cell
PSSCH Physical Sidelink Shared Channel
QoS Quality of Service
RA Resource Allocation
RAM Random Access Memory
RAN Radio Access Network
RAT Radio Access Technology
Rel Release
RLC Radio Link Control
RNA Radio Access Network based Notification Area
ROM Read Only Memory
RRC Radio Resource Control
RSU Road Side Unit
RX Reception
SA Stand-Alone
SCEF Service Capability Exposure Function
SCell Secondary Cell
SCG Secondary Cell Group
SCI Sidelink Control Information
SDAP Service Data Adaptation Protocol
SDU Service Data Unit
SeNB Secondary Enhanced or Evolved Node B
SgNB Secondary New Radio Base Station
SIB System Information Block
SL Sidelink
SLRB Sidelink Radio Bearer
SMF Session Management Function
SN Secondary Node
SRB Signaling Radio Bearer
S-RLF Secondary Node Radio Link Failure
TS Technical Specification
TX Transmission
UDM Unified Data Management
UE User Equipment
UM Unacknowledged Mode
UP User Plane
UPF User Plane Function
URLLC Ultra Reliable Low Latency Communications
V2I Vehicle-to-Infrastructure
V2P Vehicle-to-Pedestrian
V2V Vehicle-to-Vehicle
V2X Vehicle-to-Everything

The invention claimed is:

1. A method performed by a first network node, comprising sending, to a second network node, Sidelink, SL, information associated with a particular SL User Equipment, UE, wherein the first network node comprises a base station that operates in accordance with a first radio access technology, and the second network node comprises a base station that operates in accordance with a second radio access technology;

wherein the SL UE operates in a dual connectivity mode in which one of the first network node and the second network node comprises a master node of the SL UE and the other one of the first network node and the second network node comprises a secondary node of the SL UE;

wherein the SL information associated with the particular SL UE comprises SL UE context information of the particular SL UE; and wherein the SL UE context information comprises information that enables the second network node to provide a SL service continuity during one of: a Secondary Node (SN) change procedure, an SN modification procedure, and an SN addition procedure.

2. The method of claim 1, wherein:
the first network node comprises an enhanced or evolved Node B, eNB; and
the second network node comprises a New Radio, NR, base station, gNB.

3. The method of claim 1, wherein:
the first network node comprises a New Radio, NR, base station, gNB; and
the second network node comprises an enhanced or evolved Node B, eNB.

4. The method of claim 1, wherein the SL information associated with the particular SL UE comprises:
one or more SL configurations of the particular SL UE; or
both the SL UE context information of the particular SL UE and the one or more SL configurations of the particular SL UE.

5. The method of claim 1, further comprising obtaining information that indicates what SL related information is to be included in the SL information sent to the second network node.

6. The method of claim 5, wherein the information that indicates what SL related information is to be included in the SL information sent to the second network node is included in:
SL Quality of Service, QoS, flow and SL Radio Bearer, SLRB, configuration information for the particular SL UE;
a SidelinkUEInformation message for the particular SL UE;
a UEAssistanceInformation message for the particular SL UE;
an SL configured grant for the particular SL UE;
information regarding Transmission/Reception, TX/RX, resource pools for the particular SL UE; or
SL UE capabilities of the particular SL UE.

7. The method of claim 1, wherein sending the SL information comprises sending the SL information via one or more inter-node messages.

8. The method of claim 7, wherein the one or more inter-node messages comprise one or more Radio Resource Control, RRC, messages.

9. A first network node for a cellular communications system, the first network node comprising:
a network interface; and
processing circuitry associated with the network interface, the processing circuitry configured to cause the first network node to send, to a second network node, Sidelink, SL, information associated with a particular SL User Equipment, UE, wherein the first network node comprises a base station that operates in accordance with a first radio access technology, and the second network node comprises a base station that operates in accordance with a second radio access technology;
wherein the SL UE operates in a dual connectivity mode in which one of the first network node and the second network node comprises a master node of the SL UE and the other one of the first network node and the second network node comprises a secondary node of the SL UE:
wherein the SL information associated with the particular SL UE comprises SL UE context information of the particular SL UE; and
wherein the SL UE context information comprises information to enable the second network node to provide a SL service continuity during one of: a Secondary Node (SN) change procedure, an SN modification procedure, and an SN addition procedure.

10. A method performed by a second network node, comprising receiving, from a first network node, Sidelink, SL, information associated with a particular SL User Equipment, UE, wherein the first network node comprises a base station that operates in accordance with a first radio access technology, and the second network node comprises a base station that operates in accordance with a second radio access technology;
wherein the SL UE operates in a dual connectivity mode in which one of the first network node and the second network node comprises a master node of the SL UE and the other one of the first network node and the second network node comprises a secondary node of the SL UE;
wherein the SL information associated with the particular SL UE comprises SL UE context information of the particular SL UE; and
wherein, based on SL UE context information, the second network node to provides a SL service continuity during one of: a Secondary Node (SN) change procedure, an SN modification procedure, and an SN addition procedure.

11. The method of claim 10, wherein:
the first network node comprises an enhanced or evolved Node B, eNB; and
the second network node comprises a New Radio, NR, base station, gNB.

12. The method of claim 10, wherein:
the first network node comprises a New Radio, NR, base station, gNB; and
the second network node comprises an enhanced or evolved Node B, eNB.

13. The method of claim 10, wherein the SL information associated with the particular SL UE comprises:
one or more SL configurations of the particular SL UE; or
both the SL UE context information of the particular SL UE and the one or more SL configurations of the particular SL UE.

14. The method of claim 10, wherein receiving the SL information comprises receiving the SL information via one or more inter-node messages.

15. The method of claim 14, wherein the one or more inter-node messages comprise one or more Radio Resource Control, RRC, messages.

16. A second network node for a cellular communications system, the second network node comprising:
a network interface; and
processing circuitry associated with the network interface, the processing circuitry configured to cause the second network node to receive, from a first network node, Sidelink, SL, information associated with a particular SL User Equipment, UE, wherein the first network node comprises a base station that operates in accordance with a first radio access technology, and the second network node comprises a base station that operates in accordance with a second radio access technology;
wherein the SL UE operates in a dual connectivity mode in which one of the first network node and the second network node comprises a master node of the SL UE and the other one of the first network node and the second network node comprises a secondary node of the SL UE;

wherein the SL information associated with the particular SL UE comprises SL UE context information of the particular SL UE; and wherein, based on SL UE context information, the second network node to provides a SL service continuity during one of: a Secondary Node (SN) change procedure, an SN modification procedure, and an SN addition procedure.

* * * * *